United States Patent
Sun et al.

(10) Patent No.: US 10,262,087 B2
(45) Date of Patent: Apr. 16, 2019

(54) DATA PROCESSING METHOD FOR INCLUDING THE EFFECT OF THE TORTUOSITY ON THE ACOUSTIC BEHAVIOR OF A FLUID IN A POROUS MEDIUM

(71) Applicant: Exa Corporation, Burlington, MA (US)

(72) Inventors: Chenghai Sun, Salem, MA (US); Franck Léon Pérot, San Francisco, CA (US); Raoyang Zhang, Burlington, MA (US); Hudong Chen, West Newton, MA (US); David M. Freed, Brisbane, CA (US); Ilya Staroselsky, Lincoln, MA (US); Adrien Mann, Berkeley, CA (US)

(73) Assignee: Dassault Systemes Simulia Corp., Johnston, RI (US)

( * ) Notice: Subject to any disclaimer, the term of this patent is extended or adjusted under 35 U.S.C. 154(b) by 420 days.

(21) Appl. No.: 14/994,943

(22) Filed: Jan. 13, 2016

(65) Prior Publication Data

US 2017/0199950 A1 Jul. 13, 2017

(51) Int. Cl.
*G06F 17/50* (2006.01)

(52) U.S. Cl.
CPC ...... *G06F 17/5018* (2013.01); *G06F 2217/82* (2013.01)

(58) Field of Classification Search
CPC .................................................. G06F 17/5018

(Continued)

(56) References Cited

U.S. PATENT DOCUMENTS 6,256,600 B1 * 7/2001 Bolton ................. G10K 11/162
  703/6
9,037,440 B2 * 5/2015 Sun ..................... G06F 17/5018
  703/2

(Continued)

FOREIGN PATENT DOCUMENTS

WO WO 2014/143166 9/2014

OTHER PUBLICATIONS

Chenghai Sun, Franck Pérot, Raoyang Zhang, Phoi-Tack Lew, Adrien Mann, Vinit Gupta, David M. Freed, Ilya Staroselsky, Hudong Chen, Lattice Boltzmann formulation for flows with acoustic porous media, Comptes Rendus Mécanique, 343 (2015), 533-544.

(Continued)

*Primary Examiner* — Andy Ho
(74) *Attorney, Agent, or Firm* — Fish & Richardson P.C.

(57) ABSTRACT

Methods, systems, and apparatus, including computer programs encoded on computer storage media, for processing data representing the effect of tortuosity on the acoustic behavior of a fluid in a porous medium. One of the methods includes generating by a first data processing program of the data processing apparatus, a model of acoustic behavior of a fluid in a porous medium including an effect of tortuosity, with the model comprising a time variable indicative of a sound speed of the fluid. The method includes rescaling the time variable of the model based on the sound speed in a fluid in the porous medium. The method also includes simulating the acoustic behavior including the effect of tortuosity of the porous medium based on the rescaling of the time-related variables within the model.

12 Claims, 18 Drawing Sheets

(58) Field of Classification Search
USPC .............................................................. 703/2
See application file for complete search history.

(56) References Cited

U.S. PATENT DOCUMENTS

| | | |
|---|---|---|
| 2002/0094412 A1 | 7/2002 | Murray et al. |
| 2006/0084859 A1 | 4/2006 | Johnson et al. |
| 2011/0010137 A1 | 1/2011 | Yeh |
| 2013/0116997 A1 | 5/2013 | Sun et al. |
| 2014/0343858 A1 | 11/2014 | Crouse et al. |
| 2015/0023828 A1* | 1/2015 | Binder .................. B22F 3/1143 419/2 |

OTHER PUBLICATIONS

Nie,X., et al., "Lattice-Boltzmann / Finite-Difference Hybrid Simulation of Transonic Flow" 47 AIAA Aero Sci Meet., AIAA, (2009); 8 pages.

Pradeep Gopalakrishnan, Raoyang Zhang, Hudong Chen, Improved Temperature Coupling Algorithm for Hybrid Thermal Lattice Boltzmann Method, U.S. Appl. No. 14/909,055, filed Jan. 29, 2016; File History retrieved on Jun. 1, 2017.

International Search Report and Written Opinion; PCT/US2017/012079; dated Mar. 13, 2017; 11 pages.

* cited by examiner

DATA PROCESSING METHOD FOR INCLUDING THE EFFECT OF THE TORTUOSITY ON THE ACOUSTIC BEHAVIOR OF A FLUID IN A POROUS MEDIUM

TECHNICAL FIELD

This description relates to a data processing apparatus for processing data representing acoustic properties of a porous medium modeled in accordance with tortuosity.

BACKGROUND

High Reynolds number flow has been simulated by generating discretized solutions of the Navier-Stokes differential equations by performing high-precision floating point arithmetic operations at each of many discrete spatial locations on variables representing the macroscopic physical quantities (e.g., density, temperature, flow velocity). Another approach replaces the differential equations with what is generally known as lattice gas (or cellular) automata, in which the macroscopic-level simulation provided by solving the Navier-Stokes equations is replaced by a microscopic-level model that performs operations on particles moving between sites on a lattice.

SUMMARY

In general, one innovative aspect of the subject matter described in this specification can be embodied in methods that include, in aspect 1, the actions of generating by a first data processing program of the data processing apparatus, a model of acoustic behavior of a fluid in a porous medium including an effect of tortuosity, with the model comprising a time variable indicative of a sound speed of the fluid. The methods include the actions of rescaling the time variable of the model based on the sound speed in a fluid in the porous medium. The methods also include the actions of simulating the acoustic behavior including the effect of tortuosity of the porous medium based on the rescaling of the time variable within the model.

The foregoing and other embodiments can each optionally include one or more of the following features, alone or in combination.

In aspect 2 according to aspect 1, the method can include the action of determining acoustic behavior within the model including the effect of the tortuosity of the porous medium.

In aspect 3 according to any of aspects 1 and 2, the acoustic behavior may include dissipation and propagation of sound waves.

In aspect 4 according to any of aspects 1, 2, and 3, rescaling the time variable may include adjusting the amount of time represented by one simulation time step.

In aspect 5 according to any of aspects 1, 2, 3, and 4, simulating the acoustic behavior may include simulating fluid flow through or within the volumetric region.

In aspect 6 according to any of aspects 1, 2, 3, 4, and 5 the model may include a momentum sink that accounts for acoustic losses of the porous medium.

In aspect 7 according to any of aspects 1, 2, 3, 4, 5, and 6 rescaling the time variable may be based on the nominal sound speed of a fluid and a sound speed of the fluid in the porous medium.

In aspect 8 according to any of aspects 1, 2, 3, 4, 5, 6, and 7 the fluid can be represented by elements, the elements can include one or more of mass, density, momentum, pressure, velocity, temperature, energy, mass fluxes, momentum fluxes, and energy fluxes within the fluid.

In aspect 9 according to any of aspects 1, 2, 3, 4, 5, 6, 7, and 8 rescaling the time variable may include rescaling a temperature of the model.

In aspect 10 according to any of aspects 1, 2, 3, 4, 5, 6, 7, 8, and 9 rescaling the time variable may include rescaling a pressure of the model.

In aspect 11 according to any of aspects 1, 2, 3, 4, 5, 6, 7, 8, 9, and 10 rescaling the time variable may include rescaling the velocity of the fluid.

In aspect 12 according to any of aspects 1, 2, 3, 4, 5, 6, 7, 8, 9, 10, and 11 rescaling the time variable may include rescaling the resistance of the porous medium.

The systems and techniques may be implemented using a lattice gas simulation that employs a Lattice Boltzmann formulation. The traditional lattice gas simulation assumes a limited number of particles at each lattice site, with the particles being represented by a short vector of bits. Each bit represents a particle moving in a particular direction. For example, one bit in the vector might represent the presence (when set to 1) or absence (when set to 0) of a particle moving along a particular direction. Such a vector might have six bits, with, for example, the values 110000 indicating two particles moving in opposite directions along the X axis, and no particles moving along the Y and Z axes. A set of collision rules governs the behavior of collisions between particles at each site (e.g., a 110000 vector might become a 001100 vector, indicating that a collision between the two particles moving along the X axis produced two particles moving away along the Y axis). The rules are implemented by supplying the state vector to a lookup table, which performs a permutation on the bits (e.g., transforming the 110000 to 001100). Particles are then moved to adjoining sites (e.g., the two particles moving along the Y axis would be moved to neighboring sites to the left and right along the Y axis).

In an enhanced system, the state vector at each lattice site includes many more bits (e.g., 54 bits for subsonic flow) to provide variation in particle energy and movement direction, and collision rules involving subsets of the full state vector are employed. In a further enhanced system, more than a single particle is permitted to exist in each momentum state at each lattice site, or voxel (these two terms are used interchangeably throughout this document). For example, in an eight-bit implementation, 0-255 particles could be moving in a particular direction at a particular voxel. The state vector, instead of being a set of bits, is a set of integers (e.g., a set of eight-bit bytes providing integers in the range of 0 to 255), each of which represents the number of particles in a given state.

In a further enhancement, Lattice Boltzmann Methods (LBM) use a mesoscopic representation of a fluid to simulate 3D unsteady compressible turbulent flow processes in complex geometries at a deeper level than possible with conventional computational fluid dynamics ("CFD") approaches. A brief overview of LBM method is provided below.

Boltzmann-Level Mesoscopic Representation

It is well known in statistical physics that fluid systems can be represented by kinetic equations on the so-called "mesoscopic" level. On this level, the detailed motion of individual particles need not be determined. Instead, properties of a fluid are represented by the particle distribution functions defined using a single particle phase space, $f=f(x, v,t)$, where x is the spatial coordinate while v is the particle velocity coordinate. The typical hydrodynamic quantities, such as mass, density, fluid velocity and temperature, are simple moments of the particle distribution function. The dynamics of the particle distribution functions obeys a Boltzmann equation:

$$\partial_t f + v \nabla_x f + F(x,t) \nabla_v f = C\{f\},\qquad \text{Eq. (1)}$$

where $F(x,t)$ represents an external or self-consistently generated body-force at $(x,t)$. The collision term C represents interactions of particles of various velocities and locations. It is important to stress that, without specifying a particular form for the collision term C, the above Boltzmann equation is applicable to all fluid systems, and not just to the well known situation of rarefied gases (as originally constructed by Boltzmann).

Generally speaking, C includes a complicated multi-dimensional integral of two-point correlation functions. For the purpose of forming a closed system with distribution functions f alone as well as for efficient computational purposes, one of the most convenient and physically consistent forms is the well-known BGK operator. The BGK operator is constructed according to the physical argument that, no matter what the details of the collisions, the distribution function approaches a well-defined local equilibrium given by $\{f^{eq}(x,v,t)\}$ via collisions:

$$C = -\frac{1}{\tau}(f - f^{eq}),\qquad \text{Eq. (2)}$$

where the parameter $\tau$ represents a characteristic relaxation time to equilibrium via collisions. Dealing with particles (e.g., atoms or molecules) the relaxation time is typically taken as a constant. In a "hybrid" (hydro-kinetic) representation, this relaxation time is a function of hydrodynamic variables like rate of strain, turbulent kinetic energy and others. Thus, a turbulent flow may be represented as a gas of turbulence particles ("eddies") with the locally determined characteristic properties.

Numerical solution of the Boltzmann-BGK equation has several computational advantages over the solution of the Navier-Stokes equations. First, it may be immediately recognized that there are no complicated nonlinear terms or higher order spatial derivatives in the equation, and thus there is little issue concerning advection instability. At this level of description, the equation is local since there is no need to deal with pressure, which offers considerable advantages for algorithm parallelization. Another desirable feature of the linear advection operator, together with the fact that there is no diffusive operator with second order spatial derivatives, is its ease in realizing physical boundary conditions such as no-slip surface or slip-surface in a way that mimics how particles truly interact with solid surfaces in reality, rather than mathematical conditions for fluid partial differential equations ("PDEs"). One of the direct benefits is that there is no problem handling the movement of the interface on a solid surface, which helps to enable lattice-Boltzmann based simulation software to successfully simulate complex turbulent aerodynamics. In addition, certain physical properties from the boundary, such as finite roughness surfaces, can also be incorporated in the force. Furthermore, the BGK collision operator is purely local, while the calculation of the self-consistent body-force can be accomplished via near-neighbor information only. Consequently, computation of the Boltzmann-BGK equation can be effectively adapted for parallel processing.

Lattice Boltzmann Formulation

Solving the continuum Boltzmann equation represents a significant challenge in that it entails numerical evaluation of an integral-differential equation in position and velocity phase space. A great simplification took place when it was observed that not only the positions but the velocity phase space could be discretized, which resulted in an efficient numerical algorithm for solution of the Boltzmann equation. The hydrodynamic quantities can be written in terms of simple sums that at most depend on nearest neighbor information. Even though historically the formulation of the lattice Boltzmann equation was based on lattice gas models prescribing an evolution of particles on a discrete set of velocities $v(\in \{c_i, i=1, \ldots, b\})$, this equation can be systematically derived from the first principles as a discretization of the continuum Boltzmann equation. As a result, LBE does not suffer from the well-known problems associated with the lattice gas approach. Therefore, instead of dealing with the continuum distribution function in phase space, $f(x,v,t)$, it is only necessary to track a finite set of discrete distributions, $f_i(x,t)$ with the subscript labeling the discrete velocity indices. The key advantage of dealing with this kinetic equation instead of a macroscopic description is that the increased phase space of the system is offset by the locality of the problem.

Due to symmetry considerations, the set of velocity values are selected in such a way that they form certain lattice structures when spanned in the configuration space. The dynamics of such discrete systems obeys the LBE having the form $f_i(x+c_i,t+1)-f_i(x,t)=C_i(x,t)$, where the collision operator usually takes the BGK form as described above. By proper choices of the equilibrium distribution forms, it can be theoretically shown that the lattice Boltzmann equation gives rise to correct hydrodynamics and thermo-hydrodynamics. That is, the hydrodynamic moments derived from $f_i(x,t)$ obey the Navier-Stokes equations in the macroscopic limit. These moments are defined as:

$$\rho(x,t) = \sum_i f_i(x,t);\ \rho u(x,t) = \sum_i c_i f_i(x,t);\qquad \text{Eq. (3)}$$
$$DT(x,t) = \sum_i (c_i - u)^2 f_i(x,t),$$

where $\rho$, u, and T are, respectively, the fluid density, velocity and temperature, and D is the dimension of the discretized velocity space (not at all equal to the physical space dimension).

Other features and advantages will be apparent from the following description, including the drawings, and the claims.

DESCRIPTION

Figure 1:
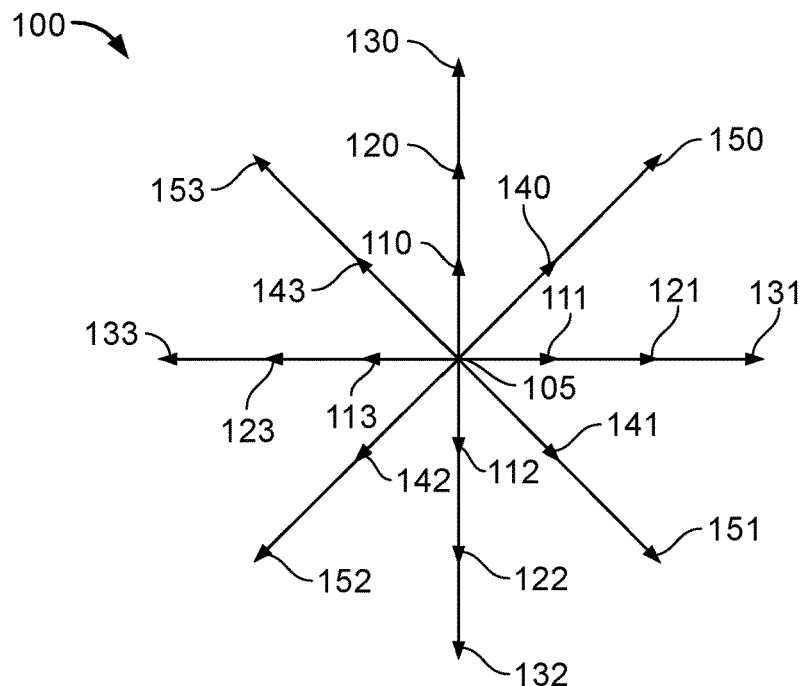
FIGS. 1 and 2 illustrate velocity components of two LBM models.

A. Volumetric Approach to Modeling Acoustic Absorption

Acoustic absorption, i.e., acoustic resistance, acoustic impedance, etc., by porous materials is an important topic in acoustics engineering. At a microscopic scale, the propagation of sound in porous media is difficult to characterize because of the topological complexity of the materials. At a macroscopic scale, porous materials with high porosity can be treated as regions of fluid which have modified properties relative to air. Sound propagation in such media can be expressed in the form of two intrinsic, frequency-dependent, and volumetric properties of the material: the characteristic impedance and the complex acoustic wave number. These properties may be modeled in different ways. For example, under certain assumptions, a given volumetric model for sound propagation in an absorbing material can be put in the form of a locally-reacting, frequency-dependent, complex impedance at the interface between two different media. Such impedance models may be used in approaches such as the Boundary Element Methods (BEM), the Finite Elements Methods (FEM), and the Statistical Energy Analysis (SEA) methods, and may be implemented as boundary conditions in the frequency domain.

For problems involving flow-induced noise, suitable Computational Fluid Dynamics (CFD) and/or Computational AeroAcoustics (CAA) numerical methods are non-linear and often time-explicit. For a time-explicit solution, time-domain surface impedance boundary conditions may allow modeling of acoustic absorption due to porous materials. However, even when a time-domain surface impedance formulation can be derived, stability and robustness may be challenging problems to overcome.

Another approach, which is described in more detail below, includes modeling of absorbing materials as volumetric fluid regions, such that sound waves travel through the material and dissipate via a momentum sink. This is analogous to the method for macroscopic modeling of flow through porous media achieved by relating the momentum sink to the flow resistance of the material following Darcy's law. For acoustic absorption modeling, there is the question of how to determine the momentum sink to achieve a desired absorption behavior. If the acoustic absorption is governed (or at least dominated) by the same physical mechanisms as the flow resistivity, then the same momentum sink behavior used to achieve the correct flow resistivity for a particular porous material should also achieve the correct acoustic absorption for that material. This approach may be applicable for any passive and homogeneous porous material. Moreover, the approach eliminates numerical stability problems since the impedance is realized in a way that satisfies passive, causal, and real conditions.

This volumetric modeling approach may be used in conjunction with a time-explicit CFD/CAA solution method based on the Lattice Boltzmann Method (LBM), such as the PowerFLOW system available from Exa Corporation of Burlington, Mass. Unlike methods based on discretizing the macroscopic continuum equations, LBM starts from a "mesoscopic" Boltzmann kinetic equation to predict macroscopic fluid dynamics. The resulting compressible and unsteady solution method may be used for predicting a variety of complex flow physics, such as aeroacoustics and pure acoustics problems. A porous media model is used to represent the flow resistivity of various components, such as air filters, radiators, heat exchangers, evaporators, and other components, which are encountered in simulating flow, such as through HVAC systems, vehicle engine compartments, and other applications.

A general discussion of a LBM-based simulation system is provided below and followed by a discussion of a volumetric modeling approach for acoustic absorption and other phenomena and a porous media interface model that may be used to support such a volumetric modeling approach.

B. Model Simulation Space

In a LBM-based physical process simulation system, fluid flow may be represented by the distribution function values $f_i$, evaluated at a set of discrete velocities $c_i$. The dynamics of the distribution function is governed by Equation 4

$$f_i(x + c_i \Delta t, t + \Delta t) = f_i(x, t) - \frac{1}{\tau}[f_i(x, t) - f_i^{eq}(x, t)] \quad \text{Eq. (4a)}$$

where $f_i^{eq}$ is known as the equilibrium distribution function, defined as:

$$f_i^{eq}(x, t) = \rho w_i \left[ 1 + \frac{\vec{c}_i \cdot \vec{u}}{T_0} + \frac{(\vec{c}_i \cdot \vec{u})^2}{2T_0^2} - \frac{u^2}{2T_0} + \frac{(\vec{c}_i \cdot \vec{u})^3}{6T_0^3} - \frac{(\vec{c}_i \cdot \vec{u})u^2}{2T_0^2} \right] \quad \text{Eq. (4b)}$$

This equation is the well-known lattice Boltzmann equation that describe the time-evolution of the distribution function, $f_i$. The left-hand side represents the change of the distribution due to the so-called "streaming process." The streaming process is when a pocket of fluid starts out at a grid location, and then moves along one of the velocity vectors to the next grid location. At that point, the "collision factor," i.e., the effect of nearby pockets of fluid on the starting pocket of fluid, is calculated. The fluid can only move to another grid location, so the proper choice of the velocity vectors is necessary so that all the components of all velocities are multiples of a common speed.

The right-hand side of the first equation is the aforementioned "collision operator" which represents the change of the distribution function due to the collisions among the pockets of fluids. The particular form of the collision operator used here is due to Bhatnagar, Gross and Krook (BGK). It forces the distribution function to go to the prescribed values given by the second equation, which is the "equilibrium" form.

From this simulation, conventional fluid variables, such as mass $\rho$ and fluid velocity u, are obtained as simple summations in Equation (3). Here, the collective values of $c_i$ and $w_i$ define a LBM model. The LBM model can be implemented efficiently on scalable computer platforms and run with great robustness for time unsteady flows and complex boundary conditions.

A standard technique of obtaining the macroscopic equation of motion for a fluid system from the Boltzmann equation is the Chapman-Enskog method in which successive approximations of the full Boltzmann equation are taken.

In a fluid system, a small disturbance of the density travels at the speed of sound. In a gas system, the speed of the sound is generally determined by the temperature. The importance of the effect of compressibility in a flow is measured by the ratio of the characteristic velocity and the sound speed, which is known as the Mach number.

Referring to FIG. 1, a first model (2D-1) 100 is a two-dimensional model that includes 21 velocities. Of these 21 velocities, one (105) represents particles that are not moving; three sets of four velocities represent particles that are moving at either a normalized speed (r) (110-113), twice the normalized speed (2r) (120-123), or three times the normalized speed (3r) (130-133) in either the positive or negative direction along either the x or y axis of the lattice; and two sets of four velocities represent particles that are moving at the normalized speed (r) (140-143) or twice the normalized speed (2r) (150-153) relative to both of the x and y lattice axes.

Figure 2:
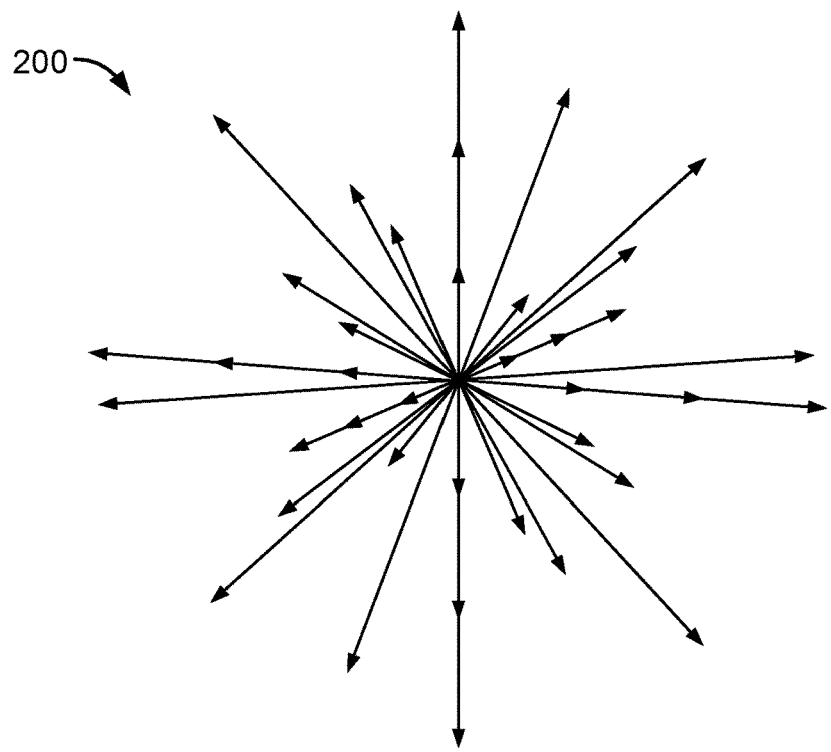

As also illustrated in FIG. 2, a second model (3D-1) 200 is a three-dimensional model that includes 39 velocities, where each velocity is represented by one of the arrowheads of FIG. 2. Of these 39 velocities, one represents particles that are not moving; three sets of six velocities represent particles that are moving at either a normalized speed (r), twice the normalized speed (2r), or three times the normalized speed (3r) in either the positive or negative direction along the x, y or z axis of the lattice; eight represent particles that are moving at the normalized speed (r) relative to all three of the x, y, z lattice axes; and twelve represent particles that are moving at twice the normalized speed (2r) relative to two of the x, y, z lattice axes.

More complex models, such as a 3D-2 model includes 101 velocities and a 2D-2 model includes 37 velocities also may be used. The velocities are more clearly described by their component along each axis as documented in Tables 1 and 2 respectively.

For the three-dimensional model 3D-2, of the 101 velocities, one represents particles that are not moving (Group 1); three sets of six velocities represent particles that are moving at either a normalized speed (r), twice the normalized speed (2r), or three times the normalized speed (3r) in either the positive or negative direction along the x, y or z axis of the lattice (Groups 2, 4, and 7); three sets of eight represent particles that are moving at the normalized speed (r), twice the normalized speed (2r), or three times the normalized speed (3r) relative to all three of the x, y, z lattice axes (Groups 3, 8, and 10); twelve represent particles that are moving at twice the normalized speed (2r) relative to two of the x, y, z lattice axes (Group 6); twenty four represent particles that are moving at the normalized speed (r) and twice the normalized speed (2r) relative to two of the x, y, z lattice axes, and not moving relative to the remaining axis (Group 5); and twenty four represent particles that are moving at the normalized speed (r) relative to two of the x, y, z lattice axes and three times the normalized speed (3r) relative to the remaining axis (Group 9).

For the two-dimensional model 2D-2, of the 37 velocities, one represents particles that are not moving (Group 1); three sets of four velocities represent particles that are moving at either a normalized speed (r), twice the normalized speed (2r), or three times the normalized speed (3r) in either the positive or negative direction along either the x or y axis of the lattice (Groups 2, 4, and 7); two sets of four velocities represent particles that are moving at the normalized speed (r) or twice the normalized speed (2r) relative to both of the x and y lattice axes; eight velocities represent particles that are moving at the normalized speed (r) relative to one of the x and y lattice axes and twice the normalized speed (2r) relative to the other axis; and eight velocities represent particles that are moving at the normalized speed (r) relative to one of the x and y lattice axes and three times the normalized speed (3r) relative to the other axis.

The LBM models described above provide a specific class of efficient and robust discrete velocity kinetic models for numerical simulations of flows in both two- and three-dimensions. A model of this kind includes a particular set of discrete velocities and weights associated with those velocities. The velocities coincide with grid points of Cartesian coordinates in velocity space which facilitates accurate and efficient implementation of discrete velocity models, particularly the kind known as the lattice Boltzmann models. Using such models, flows can be simulated with high fidelity.

Figure 3:
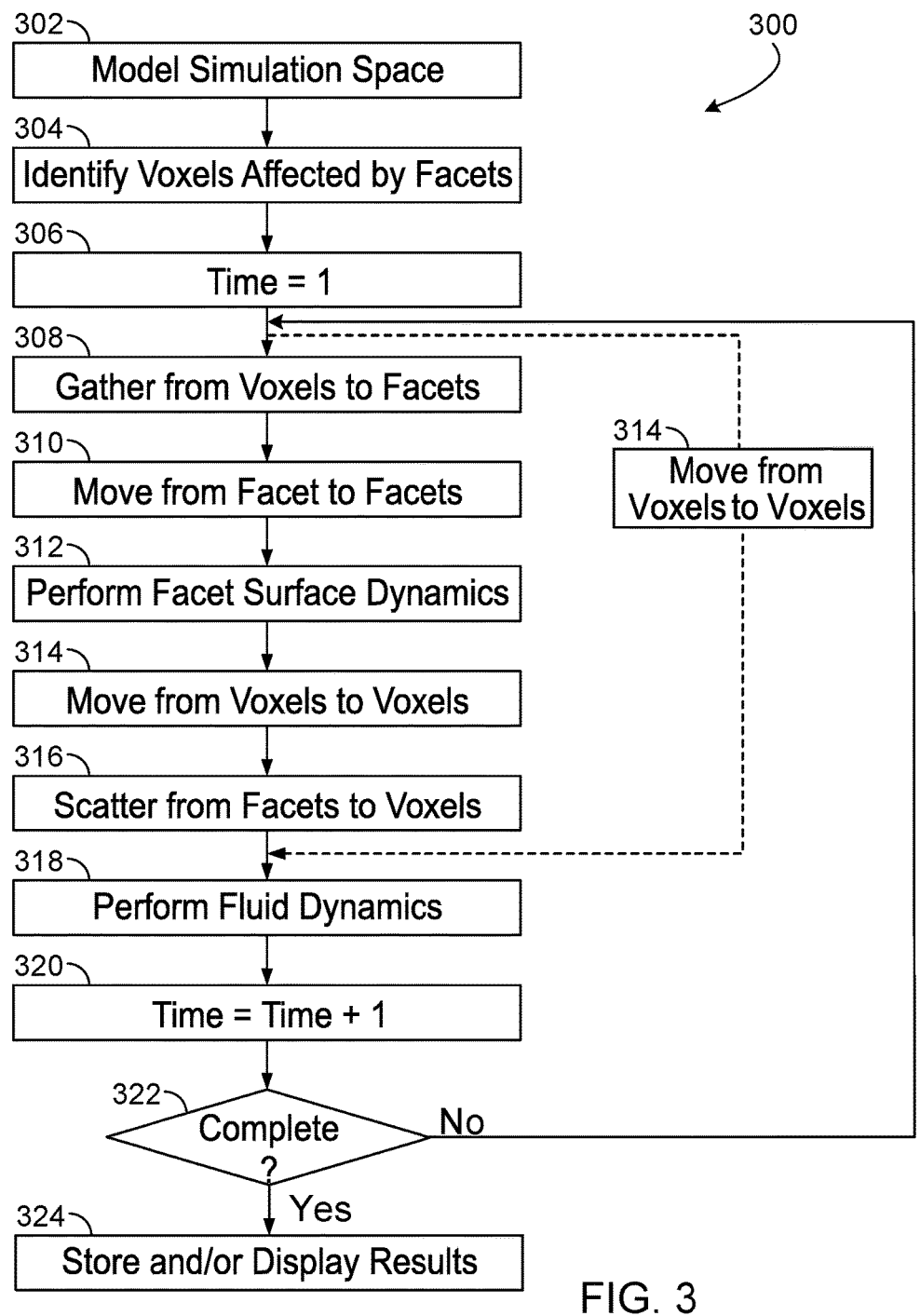
FIG. 3 is a flow chart of a procedure followed by a physical process simulation system.

Referring to FIG. 3, a physical process simulation system operates according to a procedure 300 to simulate a physical process such as fluid flow. Prior to the simulation, a simulation space is modeled as a collection of voxels (step 302). Typically, the simulation space is generated using a computer-aided-design (CAD) program. For example, a CAD program could be used to draw a micro-device positioned in a wind tunnel. Thereafter, data produced by the CAD program is processed to add a lattice structure having appropriate resolution and to account for objects and surfaces within the simulation space.

The resolution of the lattice may be selected based on the Reynolds number of the system being simulated. The Reynolds number is related to the viscosity (v) of the flow, the characteristic length (L) of an object in the flow, and the characteristic velocity (u) of the flow:

$$Re=uL/v. \qquad \text{Eq. (5)}$$

The characteristic length of an object represents large scale features of the object. For example, if flow around a micro-device were being simulated, the height of the micro-device might be considered to be the characteristic length. When flow around small regions of an object (e.g., the side mirror of an automobile) is of interest, the resolution of the simulation may be increased, or areas of increased resolution may be employed around the regions of interest. The dimensions of the voxels decrease as the resolution of the lattice increases.

The state space is represented as $f_i(x,t)$, where $f_i$ represents the number of elements, or particles, per unit volume in state i (i.e., the density of particles in state i) at a lattice site denoted by the three-dimensional vector x at a time t. For a known time increment, the number of particles is referred to simply as $f_i(x)$. The combination of all states of a lattice site is denoted as f(x).

The number of states is determined by the number of possible velocity vectors within each energy level. The velocity vectors consist of integer linear speeds in a space having three dimensions: x, y, and z. The number of states is increased for multiple-species simulations.

Each state i represents a different velocity vector at a specific energy level (i.e., energy level zero, one or two). The velocity c of each state is indicated with its "speed" in each of the three dimensions as follows:

$$c_i = (c_{i,x}, c_{i,y}, c_{i,z}).$$  Eq. (6)

The energy level zero state represents stopped particles that are not moving in any dimension, i.e. $c_{stopped} = (0, 0, 0)$. Energy level one states represent particles having a ±1 speed in one of the three dimensions and a zero speed in the other two dimensions. Energy level two states represent particles having either a ±1 speed in all three dimensions, or a ±2 speed in one of the three dimensions and a zero speed in the other two dimensions.

Generating all of the possible permutations of the three energy levels gives a total of 39 possible states (one energy zero state, 6 energy one states, 8 energy three states, 6 energy four states, 12 energy eight states and 6 energy nine states.).

Each voxel (i.e., each lattice site) is represented by a state vector f(x). The state vector completely defines the status of the voxel and includes 39 entries. The 39 entries correspond to the one energy zero state, 6 energy one states, 8 energy three states, 6 energy four states, 12 energy eight states and 6 energy nine states. By using this velocity set, the system can produce Maxwell-Boltzmann statistics for an achieved equilibrium state vector.

Figure 4:
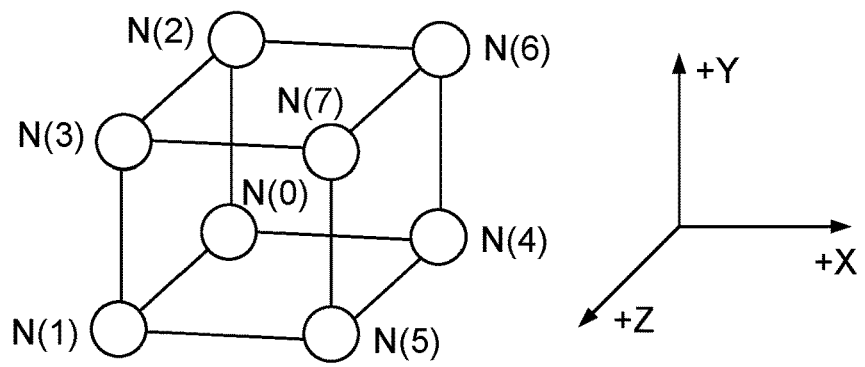
FIG. 4 is a perspective view of a microblock.

For processing efficiency, the voxels are grouped in 2×2×2 volumes called microblocks. The microblocks are organized to permit parallel processing of the voxels and to minimize the overhead associated with the data structure. A short-hand notation for the voxels in the microblock is defined as $N_i(n)$, where n represents the relative position of the lattice site within the microblock and $n \in \{0, 1, 2, \ldots, 7\}$. A microblock is illustrated in FIG. 4.

Figure 5A:
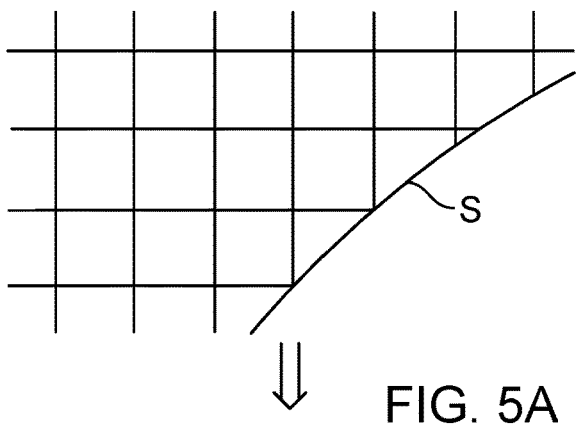
FIGS. 5A and 5B are illustrations of lattice structures used by the system of FIG. 3.
Figure 5B:
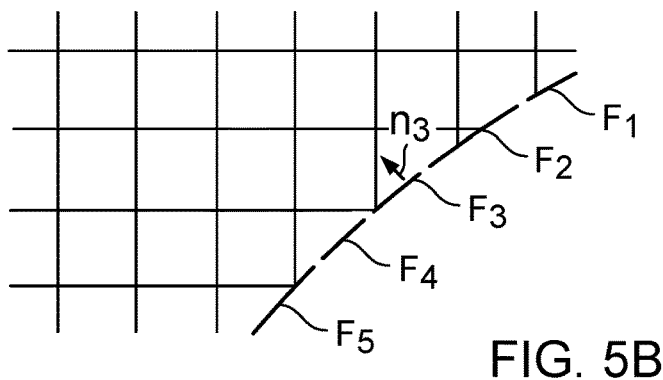

Referring to FIGS. 5A and 5B, a surface S (FIG. 3A) is represented in the simulation space (FIG. 5B) as a collection of facets $F_\alpha$:

$$S = \{F_\alpha\}$$  Eq.(7)

where $\alpha$ is an index that enumerates a particular facet. A facet is not restricted to the voxel boundaries, but is typically sized on the order of or slightly smaller than the size of the voxels adjacent to the facet so that the facet affects a relatively small number of voxels. Properties are assigned to the facets for the purpose of implementing surface dynamics. In particular, each facet $F_\alpha$ has a unit normal ($n_\alpha$), a surface area ($A_\alpha$), a center location ($x_\alpha$), and a facet distribution function ($f_i(\alpha)$) that describes the surface dynamic properties of the facet.

Figure 6:
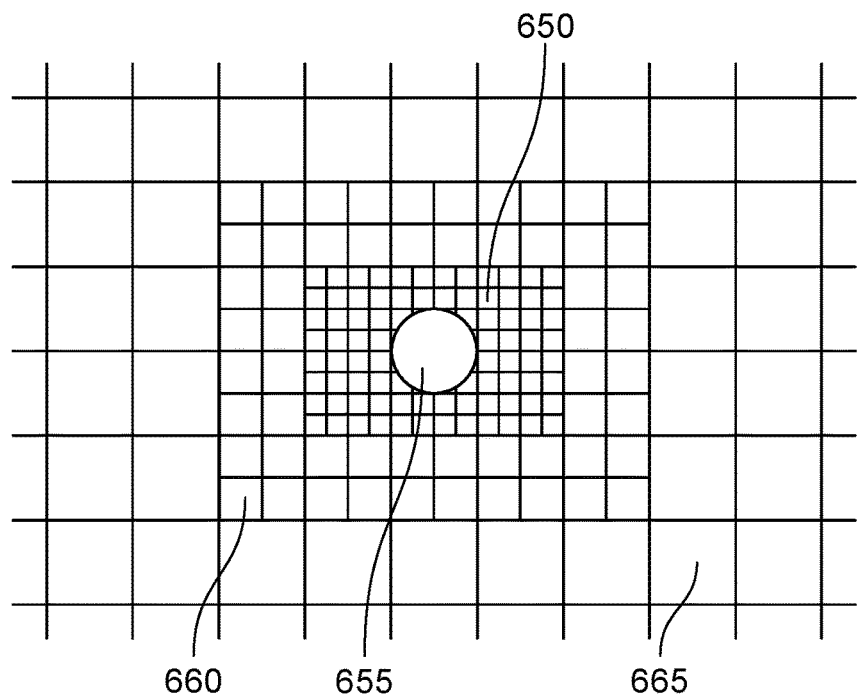
FIGS. 6 and 7 illustrate variable resolution techniques.
Figure 7:
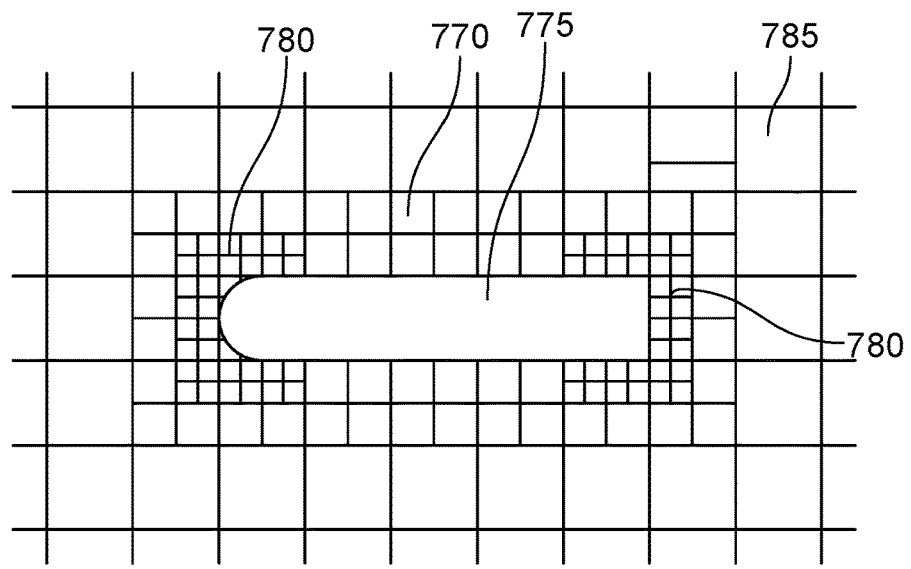

Referring to FIG. 6, different levels of resolution may be used in different regions of the simulation space to improve processing efficiency. Typically, the region 650 around an object 655 is of the most interest and is therefore simulated with the highest resolution. Because the effect of viscosity decreases with distance from the object, decreasing levels of resolution (i.e., expanded voxel volumes) are employed to simulate regions 660, 665 that are spaced at increasing distances from the object 655. Similarly, as illustrated in FIG. 7, a lower level of resolution may be used to simulate a region 770 around less significant features of an object 775 while the highest level of resolution is used to simulate regions 780 around the most significant features (e.g., the leading and trailing surfaces) of the object 775. Outlying regions 785 are simulated using the lowest level of resolution and the largest voxels.

C. Identify Voxels Affected By Facets

Referring again to FIG. 3, once the simulation space has been modeled (step 302), voxels affected by one or more facets are identified (step 304). Voxels may be affected by facets in a number of ways. First, a voxel that is intersected by one or more facets is affected in that the voxel has a reduced volume relative to non-intersected voxels. This occurs because a facet, and material underlying the surface represented by the facet, occupies a portion of the voxel. A fractional factor $P_f(x)$ indicates the portion of the voxel that is unaffected by the facet (i.e., the portion that can be occupied by a fluid or other materials for which flow is being simulated). For non-intersected voxels, $P_f(x)$ equals one.

Voxels that interact with one or more facets by transferring particles to the facet or receiving particles from the facet are also identified as voxels affected by the facets. All voxels that are intersected by a facet will include at least one state that receives particles from the facet and at least one state that transfers particles to the facet. In most cases, additional voxels also will include such states.

Figure 8:
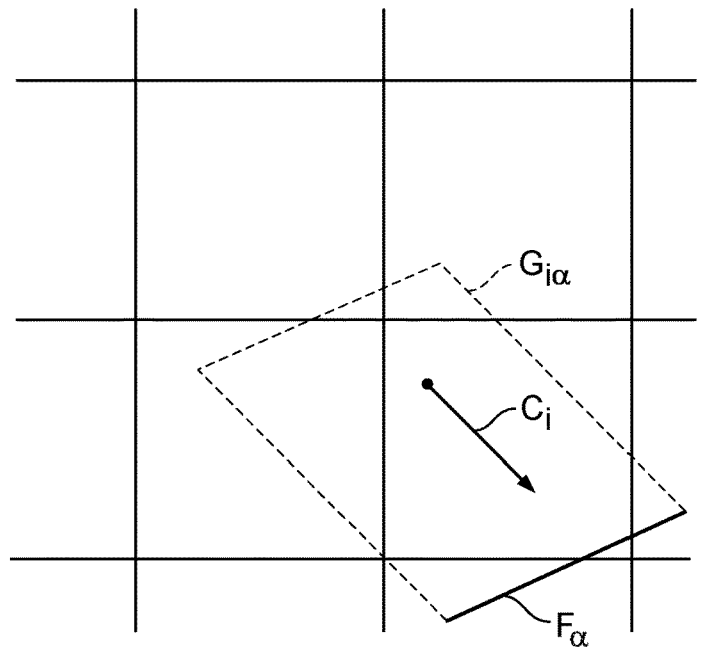
FIG. 8 illustrates regions affected by a facet of a surface.

Referring to FIG. 8, for each state i having a non-zero velocity vector $c_i$, a facet $F_\alpha$ receives particles from, or transfers particles to, a region defined by a parallelepiped $G_{i\alpha}$ having a height defined by the magnitude of the vector dot product of the velocity vector $c_i$ and the unit normal $n_\alpha$ of the facet ($|c_i n_\alpha|$) and a base defined by the surface area $A_\alpha$ of the facet so that the volume $V_{i\alpha}$ of the parallelepiped $G_{i\alpha}$ equals:

$$V_{i\alpha} = |c_i n_\alpha| A_\alpha$$  Eq. (8)

The facet $F_\alpha$ receives particles from the volume $V_{i\alpha}$ when the velocity vector of the state is directed toward the facet ($|c_i n_i| < 0$), and transfers particles to the region when the velocity vector of the state is directed away from the facet ($|c_i n_i| > 0$). As will be discussed below, this expression must be modified when another facet occupies a portion of the parallelepiped $G_{i\alpha}$, a condition that could occur in the vicinity of non-convex features such as interior corners.

The parallelepiped $G_{i\alpha}$ of a facet $F_\alpha$ may overlap portions or all of multiple voxels. The number of voxels or portions thereof is dependent on the size of the facet relative to the size of the voxels, the energy of the state, and the orientation of the facet relative to the lattice structure. The number of affected voxels increases with the size of the facet. Accordingly, the size of the facet, as noted above, is typically selected to be on the order of or smaller than the size of the voxels located near the facet.

The portion of a voxel N(x) overlapped by a parallelepiped $G_{i\alpha}$ is defined as $V_{i\alpha}(x)$. Using this term, the flux $\Gamma_{i\alpha}(x)$ of state i particles that move between a voxel N(x) and a facet $F_\alpha$ equals the density of state i particles in the voxel ($N_i(x)$) multiplied by the volume of the region of overlap with the voxel ($V_{i\alpha}(x)$):

$$\Gamma_{i\alpha}(x) = N_i(x) V_{i\alpha}(x).$$  Eq. (9)

When the parallelepiped $G_{i\alpha}$ is intersected by one or more facets, the following condition is true:

$$V_{i\alpha} = \Sigma V_\alpha(x) + \Sigma V_{i\alpha}(\beta)$$  Eq. (10)

where the first summation accounts for all voxels overlapped by $G_{i\alpha}$ and the second term accounts for all facets that intersect $G_{i\alpha}$. When the parallelepiped $G_{i\alpha}$ is not intersected by another facet, this expression reduces to:

$$V_{i\alpha} = \Sigma V_{i\alpha}(x). \qquad \text{Eq. (11)}$$

D. Perform Simulation

Once the voxels that are affected by one or more facets are identified (step 304), a timer is initialized to begin the simulation (step 306). During each time increment of the simulation (also referred to herein as a time step), movement of particles from voxel to voxel is simulated by an advection stage (steps 308-316) that accounts for interactions of the particles with surface facets. Next, a collision stage (step 318) simulates the interaction of particles within each voxel. Thereafter, the timer is incremented (step 320). If the incremented timer does not indicate that the simulation is complete (step 322), the advection and collision stages (steps 308-320) are repeated. If the incremented timer indicates that the simulation is complete (step 322), results of the simulation are stored and/or displayed (step 324).

1. Boundary Conditions For Surface

To correctly simulate interactions with a surface, each facet must meet four boundary conditions. First, the combined mass of particles received by a facet must equal the combined mass of particles transferred by the facet (i.e., the net mass flux to the facet must equal zero). Second, the combined energy of particles received by a facet must equal the combined energy of particles transferred by the facet (i.e., the net energy flux to the facet must equal zero). These two conditions may be satisfied by requiring the net mass flux at each energy level (i.e., energy levels one and two) to equal zero.

The other two boundary conditions are related to the net momentum of particles interacting with a facet. For a surface with no skin friction, referred to herein as a slip surface, the net tangential momentum flux must equal zero and the net normal momentum flux must equal the local pressure at the facet. Thus, the components of the combined received and transferred momentums that are perpendicular to the normal $n_\alpha$ of the facet (i.e., the tangential components) must be equal, while the difference between the components of the combined received and transferred momentums that are parallel to the normal $n_\alpha$ of the facet (i.e., the normal components) must equal the local pressure at the facet. For non-slip surfaces, friction of the surface reduces the combined tangential momentum of particles transferred by the facet relative to the combined tangential momentum of particles received by the facet by a factor that is related to the amount of friction.

2. Gather From Voxels to Facets

As a first step in simulating interaction between particles and a surface, particles are gathered from the voxels and provided to the facets (step 308). As noted above, the flux of state i particles between a voxel $N(x)$ and a facet $F_\alpha$ is:

$$\Gamma_{i\alpha}(x) = N_i(x) V_{i\alpha}(x). \qquad \text{Eq. (12)}$$

From this, for each state i directed toward a facet $F_\alpha(c_i n_\alpha < 0)$, the number of particles provided to the facet $F_\alpha$ by the voxels is:

$$\Gamma_{i\alpha V \to F} = \sum_X \Gamma_{i\alpha}(x) = \sum_x N_i(x) V_{i\alpha}(x) \qquad \text{Eq. (13)}$$

Only voxels for which $V_{i\alpha}(x)$ has a non-zero value must be summed. As noted above, the size of the facets is selected so that $V_{i\alpha}(x)$ has a non-zero value for only a small number of voxels. Because $V_{i\alpha}(x)$ and $P_f(x)$ may have non-integer values, $\Gamma_\alpha(x)$ is stored and processed as a real number.

3. Move From Facet to Facet

Figure 10:
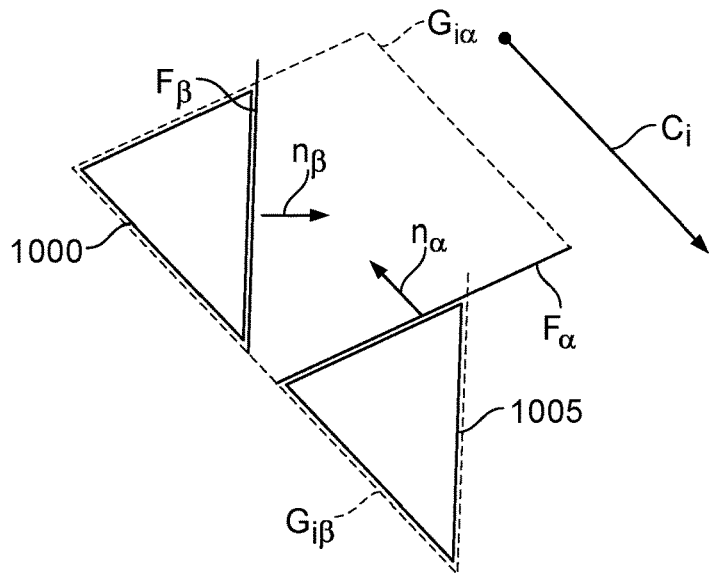
FIG. 10 illustrates movement of particles from a surface to a surface.

Next, particles are moved between facets (step 310). If the parallelepiped $G_{i\alpha}$ for an incoming state $(c_i n_\alpha < 0)$ of a facet $F_\alpha$ is intersected by another facet $F_\beta$, then a portion of the state i particles received by the facet $F_\alpha$ will come from the facet $F_\beta$. In particular, facet $F_\alpha$ will receive a portion of the state i particles produced by facet $F_\beta$ during the previous time increment. This relationship is illustrated in FIG. 10, where a portion 1000 of the parallelepiped $G_{i\alpha}$ that is intersected by facet $F_\beta$ equals a portion 1005 of the parallelepiped $G_{i\beta}$ that is intersected by facet $F_\alpha$. As noted above, the intersected portion is denoted as $V_{i\alpha}(\beta)$. Using this term, the flux of state i particles between a facet $F_\beta$ and a facet $F_\alpha$ may be described as:

$$\Gamma_{i\alpha}(\beta, t-1) = \Gamma_i(\beta) V_{i\alpha}(\beta) / V_{i\alpha}, \qquad \text{Eq. (14)}$$

where $\Gamma_i(\beta, t-1)$ is a measure of the state i particles produced by the facet $F_\beta$ during the previous time increment. From this, for each state i directed toward a facet $F_\alpha(c_i n_\alpha < 0)$, the number of particles provided to the facet $F_\alpha$ by the other facets is:

$$\Gamma_{i\alpha F \to F} = \sum_\beta \Gamma_{i\alpha}(\beta) = \sum_\beta \Gamma_i(\beta, t-1) V_{i\alpha}(\beta) / V_{i\alpha} \qquad \text{Eq. (15)}$$

and the total flux of state i particles into the facet is:

$$\Gamma_{iIN}(\alpha) = \qquad \text{Eq. (16)}$$
$$\Gamma_{i\alpha V \to F} + \Gamma_{i\alpha F \to F} = \sum_x N_i(x) V_{i\alpha}(x) + \sum_\beta \Gamma_i(\beta, t-1) V_{i\alpha}(\beta) / V_{i\alpha}$$

The state vector $N(\alpha)$ for the facet, also referred to as a facet distribution function, has 54 entries corresponding to the 54 entries of the voxel state vectors. The input states of the facet distribution function $N(\alpha)$ are set equal to the flux of particles into those states divided by the volume $V_{i\alpha}$:

$$N_i(\alpha) = \Gamma_{iIN}(\alpha) / V_{i\alpha}, \qquad \text{Eq. (17)}$$

for $c_i n_\alpha < 0$.

The facet distribution function is a simulation tool for generating the output flux from a facet, and is not necessarily representative of actual particles. To generate an accurate output flux, values are assigned to the other states of the distribution function. Outward states are populated using the technique described above for populating the inward states:

$$N_i(\alpha) = \Gamma_{iOTHER}(\alpha) / V \qquad \text{Eq. (18)}$$

for $c_i n_\alpha \geq 0$, wherein $\Gamma_{iOTHER}(\alpha)$ is determined using the technique described above for generating $\Gamma_{iIN}(\alpha)$, but applying the technique to states $(c_i n_\alpha \geq 0)$ other than incoming states $(c_i n_\alpha < 0)$. In an alternative approach, $\Gamma_{iOTHER}(\alpha)$ may be generated using values of $\Gamma_{iOUT}(\alpha)$ from the previous time step so that:

$$\Gamma_{iOTHER}(\alpha, t) = \Gamma_{iOUT}(\alpha, t-1). \qquad \text{Eq. (19)}$$

For parallel states $(c_i n_\alpha = 0)$, both $V_{i\alpha}$ and $V_{i\alpha}(x)$ are zero. In the expression for $N_i(\alpha)$, $V_{i\alpha}(x)$ appears in the numerator (from the expression for $\Gamma_{iOTHER}(\alpha)$ and $V_{i\alpha}$ appears in the denominator (from the expression for $N_i(\alpha)$). Accordingly, $N_i(\alpha)$ for parallel states is determined as the limit of $N_i(\alpha)$ as $V_{i\alpha}$ and $V_{i\alpha}(x)$ approach zero.

The values of states having zero velocity (i.e., rest states and states (0, 0, 0, 2) and (0, 0, 0, −2)) are initialized at the beginning of the simulation based on initial conditions for temperature and pressure. These values are then adjusted over time.

4. Perform Facet Surface Dynamics

Figure 11:
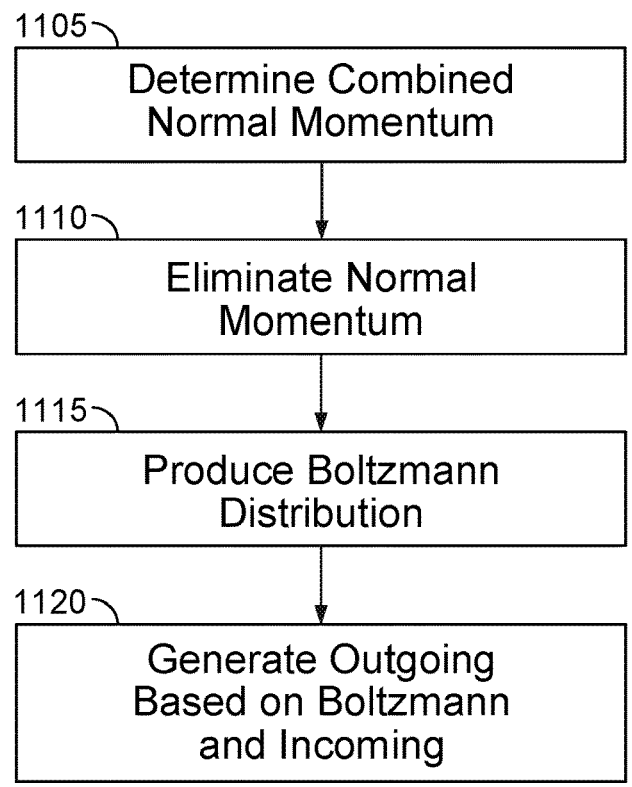
FIG. 11 is a flow chart of a procedure for performing surface dynamics.

Next, surface dynamics are performed for each facet to satisfy the four boundary conditions discussed above (step 312). A procedure for performing surface dynamics for a facet is illustrated in FIG. 11. Initially, the combined momentum normal to the facet $F_\alpha$ is determined (step 1105) by determining the combined momentum $P(\alpha)$ of the particles at the facet as:

$$P(\alpha) = \sum_i c_i * N_i^\alpha \qquad \text{Eq. (20)}$$

for all i. From this, the normal momentum $P_n(\alpha)$ is determined as:

$$P_n(\alpha) = n_\alpha \cdot P(\alpha). \qquad \text{Eq. (21)}$$

This normal momentum is then eliminated using a pushing/pulling technique (step 1110) to produce $N_{n-}(\alpha)$. According to this technique, particles are moved between states in a way that affects only normal momentum. The pushing/pulling technique is described in U.S. Pat. No. 5,594,671, which is incorporated by reference.

Thereafter, the particles of $N_{n-}(\alpha)$ are collided to produce a Boltzmann distribution $N_{n-\beta}(\alpha)$ (step 1115). As described below with respect to performing fluid dynamics, a Boltzmann distribution may be achieved by applying a set of collision rules to $N_{n-}(\alpha)$.

An outgoing flux distribution for the facet $F_\alpha$ is then determined (step 1120) based on the incoming flux distribution and the Boltzmann distribution. First, the difference between the incoming flux distribution $\Gamma_i(\alpha)$ and the Boltzmann distribution is determined as:

$$\Delta\Gamma_i(\alpha) = \Gamma_{iIN}(\alpha) - N_{n-\beta i}(\alpha) V_{i\alpha}. \qquad \text{Eq. (22)}$$

Using this difference, the outgoing flux distribution is:

$$\Gamma_{iOUT}(\alpha) = N_{n-\beta i}(\alpha) V_{i\alpha} - \Delta\Gamma_{i^*}(\alpha), \qquad \text{Eq. (23)}$$

for $n_\alpha c_i > 0$ and where i* is the state having a direction opposite to state i. For example, if state i is (1, 1, 0, 0), then state i* is (−1, −1, 0, 0). To account for skin friction and other factors, the outgoing flux distribution may be further refined to:

$$\Gamma_{iOUT}(\alpha) = N_{n-Bi}(\alpha)V_{i\alpha} - \Delta\Gamma_{i^*}(\alpha) + C_f(n_\alpha \cdot c_i)[N_{n-Bi^*}(\alpha) - N_{n-Bi}(\alpha)]V_{i\alpha} + (n_\alpha \cdot c_i)(t_{1\alpha} \cdot c_i)\Delta N_{j,1} V_{i\alpha} + (n_\alpha \cdot c_i)(t_{2\alpha} \cdot c_i)\Delta N_{j,2} V_{i\alpha} \qquad \text{Eq. (24)}$$

for $n_\alpha c_i > 0$, where $C_f$ is a function of skin friction, $t_{i\alpha}$ is a first tangential vector that is perpendicular to $n_\alpha$, $t_{2\alpha}$ is a second tangential vector that is perpendicular to both $n_\alpha$ and $t_{1\alpha}$, and $\Delta N_{j,1}$ and $\Delta N_{j,2}$ are distribution functions corresponding to the energy (j) of the state i and the indicated tangential vector. The distribution functions are determined according to:

$$\Delta N_{j,1,2} = -\frac{1}{2j^2}\left(n_\alpha \cdot \sum_i c_i c_i N_{n-Bi}(\alpha) \cdot t_{1,2\alpha}\right) \qquad \text{Eq. (25)}$$

where j equals 1 for energy level 1 states and 2 for energy level 2 states.

The functions of each term of the equation for $\Gamma_{iOUT}(\alpha)$ are as follows. The first and second terms enforce the normal momentum flux boundary condition to the extent that collisions have been effective in producing a Boltzmann distribution, but include a tangential momentum flux anomaly. The fourth and fifth terms correct for this anomaly, which may arise due to discreteness effects or non-Boltzmann structure due to insufficient collisions. Finally, the third term adds a specified amount of skin fraction to enforce a desired change in tangential momentum flux on the surface. Generation of the friction coefficient $C_f$ is described below. Note that all terms involving vector manipulations are geometric factors that may be calculated prior to beginning the simulation.

From this, a tangential velocity is determined as:

$$u_i(\alpha) = (P(\alpha) - P_n(\alpha) n_\alpha)/\rho, \qquad \text{Eq. (26)}$$

where $\rho$ is the density of the facet distribution:

$$\rho = \sum_i N_i(\alpha) \qquad \text{Eq. (27)}$$

As before, the difference between the incoming flux distribution and the Boltzmann distribution is determined as:

$$\Delta\Gamma_i(\alpha) = \Gamma_{iIN}(\alpha) - N_{n-\beta i}(\alpha) V_{i\alpha}. \qquad \text{Eq. (28)}$$

The outgoing flux distribution then becomes:

$$\Gamma_{iOUT}(\alpha) = N_{n-\beta i}(\alpha)V_{i\alpha} - \Delta\Gamma_{i^*}(\alpha) + C_f(n_\alpha c_i)[N_{n-\beta i^*}(\alpha) - N_{n-\beta i}(\alpha)]V_{i\alpha}, \qquad \text{Eq. (29)}$$

which corresponds to the first two lines of the outgoing flux distribution determined by the previous technique but does not require the correction for anomalous tangential flux.

Using either approach, the resulting flux-distributions satisfy all of the momentum flux conditions, namely:

$$\sum_{i,c_i \cdot n_\alpha > 0} c_i \Gamma_{i\alpha OUT} - \sum_{i,c_i \cdot n_\alpha < 0} c_i \Gamma_{i\alpha IN} = p_\alpha n_\alpha A_\alpha - C_f p_\alpha u_\alpha A_\alpha \qquad \text{Eq. (30)}$$

where $p_\alpha$ is the equilibrium pressure at the facet $F_\alpha$ and is based on the averaged density and temperature values of the voxels that provide particles to the facet, and $u_\alpha$ is the average velocity at the facet.

To ensure that the mass and energy boundary conditions are met, the difference between the input energy and the output energy is measured for each energy level j as:

$$\Delta\Gamma_{\alpha mj} = \sum_{i, c_{ji} \cdot n_\alpha < 0} \Gamma_{\alpha ji IN} - \sum_{i, c_{ji} \cdot n_\alpha > 0} \Gamma_{\alpha ji OUT} \qquad \text{Eq. (31)}$$

where the index j denotes the energy of the state i. This energy difference is then used to generate a difference term:

$$\delta\Gamma_{\alpha ji} = V_{i\alpha}\Delta\Gamma_{\alpha mj} \bigg/ \sum_{i, c_{ji} \cdot n_\alpha < 0} V_{i\alpha} \qquad \text{Eq. (32)}$$

for $c_{ji} n_\alpha > 0$. This difference term is used to modify the outgoing flux so that the flux becomes:

$$\Gamma_{\alpha ji OUTf} = \Gamma_{\alpha ji OUT} + \delta\Gamma_{\alpha ji} \qquad \text{Eq. (33)}$$

for $c_{ji}n_\alpha > 0$. This operation corrects the mass and energy flux while leaving the tangential momentum flux unaltered. This adjustment is small if the flow is approximately uniform in the neighborhood of the facet and near equilibrium. The resulting normal momentum flux, after the adjustment, is slightly altered to a value that is the equilibrium pressure based on the neighborhood mean properties plus a correction due to the non-uniformity or non-equilibrium properties of the neighborhood.

5. Move From Voxels to Voxels

Referring again to FIG. 3, particles are moved between voxels along the three-dimensional rectilinear lattice (step 314). This voxel to voxel movement is the only movement operation performed on voxels that do not interact with the facets (i.e., voxels that are not located near a surface). In typical simulations, voxels that are not located near enough to a surface to interact with the surface constitute a large majority of the voxels.

Each of the separate states represents particles moving along the lattice with integer speeds in each of the three dimensions: x, y, and z. The integer speeds include: 0, ±1, and ±2. The sign of the speed indicates the direction in which a particle is moving along the corresponding axis.

For voxels that do not interact with a surface, the move operation is computationally quite simple. The entire population of a state is moved from its current voxel to its destination voxel during every time increment. At the same time, the particles of the destination voxel are moved from that voxel to their own destination voxels. For example, an energy level 1 particle that is moving in the +1x and +1y direction (1, 0, 0) is moved from its current voxel to one that is +1 over in the x direction and 0 for other direction. The particle ends up at its destination voxel with the same state it had before the move (1,0,0). Interactions within the voxel will likely change the particle count for that state based on local interactions with other particles and surfaces. If not, the particle will continue to move along the lattice at the same speed and direction.

Figure 9:
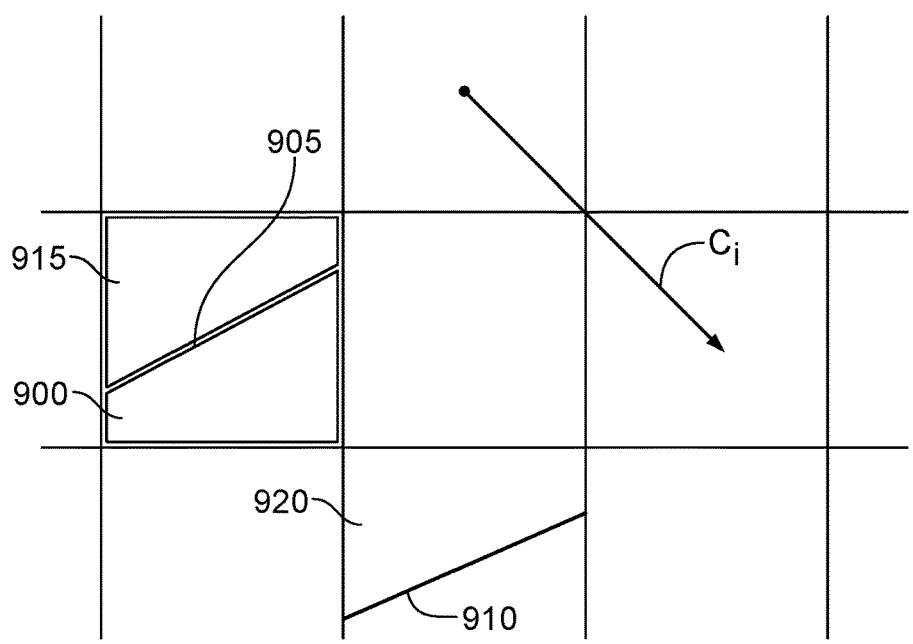
FIG. 9 illustrates movement of particles from a voxel to a surface.

The move operation becomes slightly more complicated for voxels that interact with one or more surfaces. This can result in one or more fractional particles being transferred to a facet. Transfer of such fractional particles to a facet results in fractional particles remaining in the voxels. These fractional particles are transferred to a voxel occupied by the facet. For example, referring to FIG. 9, when a portion 900 of the state i particles for a voxel 905 is moved to a facet 910 (step 308), the remaining portion 915 is moved to a voxel 920 in which the facet 910 is located and from which particles of state i are directed to the facet 910. Thus, if the state population equaled 25 and $V_{i\alpha}(x)$ equaled 0.25 (i.e., a quarter of the voxel intersects the parallelepiped $G_{i\alpha}$), then 6.25 particles would be moved to the facet $F_\alpha$ and 18.75 particles would be moved to the voxel occupied by the facet $F_\alpha$. Because multiple facets could intersect a single voxel, the number of state i particles transferred to a voxel N(f) occupied by one or more facets is:

$$N_i(f) = N_i(x)\left(1 - \sum_\alpha V_{i\alpha}(x)\right) \quad \text{Eq. (34)}$$

where N(x) is the source voxel.

6. Scatter From Facets to Voxels

Next, the outgoing particles from each facet are scattered to the voxels (step 316). Essentially, this step is the reverse of the gather step by which particles were moved from the voxels to the facets. The number of state i particles that move from a facet $F_\alpha$ to a voxel N(x) is:

$$N_{\alpha iF \to V} = \frac{1}{P_f(x)} V_{\alpha i}(x)\Gamma_{\alpha iOUT_f} / V_{\alpha i} \quad \text{Eq. (35)}$$

where $P_f(x)$ accounts for the volume reduction of partial voxels. From this, for each state i, the total number of particles directed from the facets to a voxel $N_{(x)}$ is:

$$N_{iF \to V} = \frac{1}{P_f(x)} \sum_\alpha V_{\alpha i}(x)\Gamma_{\alpha iOUT_f} / V_{\alpha i} \quad \text{Eq. (36)}$$

After scattering particles from the facets to the voxels, combining them with particles that have advected in from surrounding voxels, and integerizing the result, it is possible that certain directions in certain voxels may either underflow (become negative) or overflow (exceed 255 in an eight-bit implementation). This would result in either a gain or loss in mass, momentum and energy after these quantities are truncated to fit in the allowed range of values. To protect against such occurrences, the mass, momentum and energy that are out of bounds are accumulated prior to truncation of the offending state. For the energy to which the state belongs, an amount of mass equal to the value gained (due to underflow) or lost (due to overflow) is added back to randomly (or sequentially) selected states having the same energy and that are not themselves subject to overflow or underflow. The additional momentum resulting from this addition of mass and energy is accumulated and added to the momentum from the truncation. By only adding mass to the same energy states, both mass and energy are corrected when the mass counter reaches zero. Finally, the momentum is corrected using pushing/pulling techniques until the momentum accumulator is returned to zero.

7. Perform Fluid Dynamics

Finally, fluid dynamics are performed (step 318). This step may be referred to as microdynamics or intravoxel operations. Similarly, the advection procedure may be referred to as intervoxel operations. The microdynamics operations described below may also be used to collide particles at a facet to produce a Boltzmann distribution.

The fluid dynamics is ensured in the lattice Boltzmann equation models by a particular collision operator known as the BGK collision model. This collision model mimics the dynamics of the distribution in a real fluid system. The collision process can be well described by the right-hand side of Equation 1 and Equation 2. After the advection step, the conserved quantities of a fluid system, specifically the density, momentum and the energy are obtained from the distribution function using Equation 3. From these quantities, the equilibrium distribution function, noted by $f^{eq}$ in equation (2), is fully specified by Equation (4). The choice of the velocity vector set $c_i$, the weights, both are listed in Table 1, together with Equation 2 ensures that the macroscopic behavior obeys the correct hydrodynamic equation.

E. Variable Resolution

Figure 12:
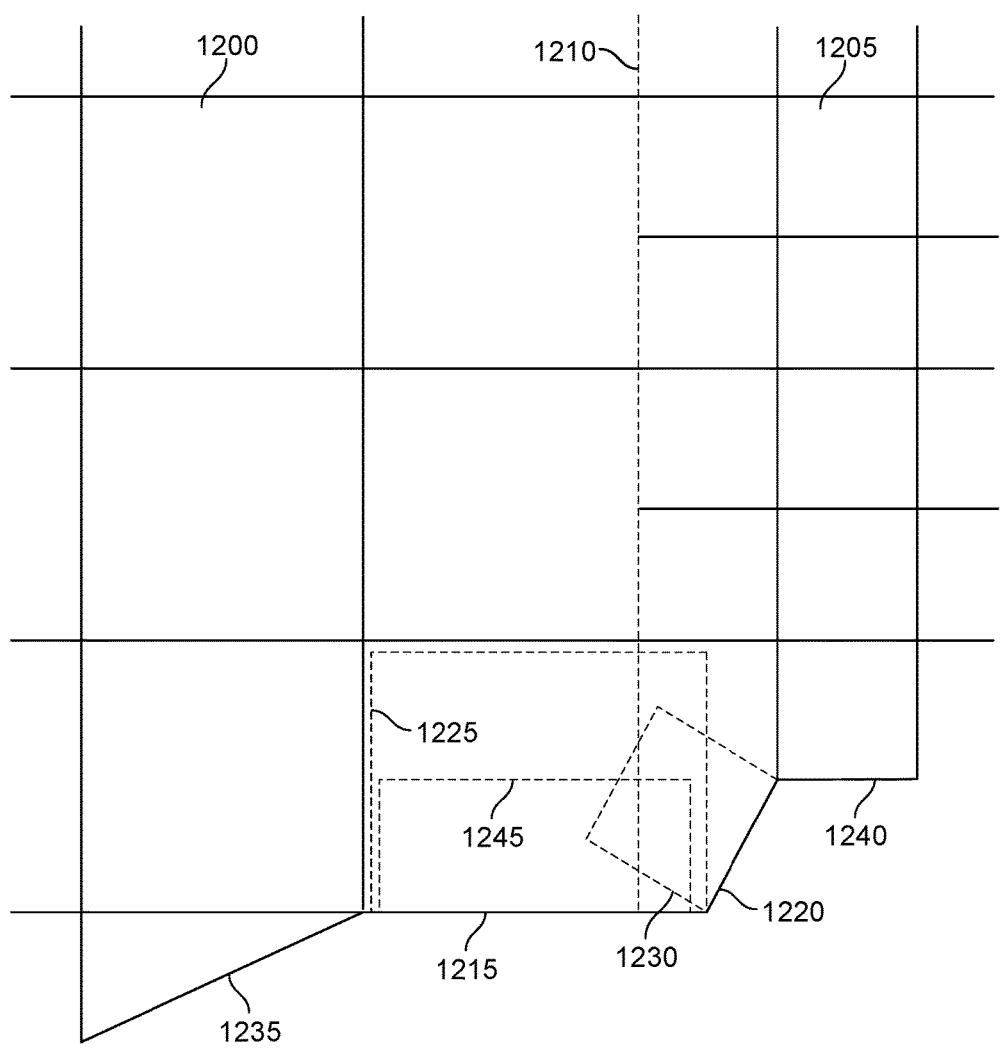
FIG. 12 illustrates an interface between voxels of different sizes.

Referring to FIG. 12, variable resolution (as illustrated in FIGS. 6 and 7 and discussed above) employs voxels of different sizes, hereinafter referred to as coarse voxels 12000 and fine voxels 1205. (The following discussion refers to voxels having two different sizes; it should be appreciated that the techniques described may be applied to three or more different sizes of voxels to provide additional levels of resolution.) The interface between regions of coarse and fine voxels is referred to as a variable resolution (VR) interface 1210.

When variable resolution is employed at or near a surface, facets may interact with voxels on both sides of the VR interface. These facets are classified as VR interface facets 1215 ($F_{\alpha IC}$) or VR fine facets 1220 ($F_{\alpha IF}$). A VR interface facet 1215 is a facet positioned on the coarse side of the VR interface and having a coarse parallelepiped 1225 extending into a fine voxel. (A coarse parallelepiped is one for which $c_i$ is dimensioned according to the dimensions of a coarse voxel, while a fine parallelepiped is one for which $c_i$ is dimensioned according to the dimensions of a fine voxel.) A VR fine facet 1220 is a facet positioned on the fine side of the VR interface and having a fine parallelepiped 1230 extending into a coarse voxel. Processing related to interface facets may also involve interactions with coarse facets 1235 ($F_{\alpha C}$) and fine facets 1240 ($F_{\alpha F}$).

For both types of VR facets, surface dynamics are performed at the fine scale, and operate as described above. However, VR facets differ from other facets with respect to the way in which particles advect to and from the VR facets.

Figure 13:
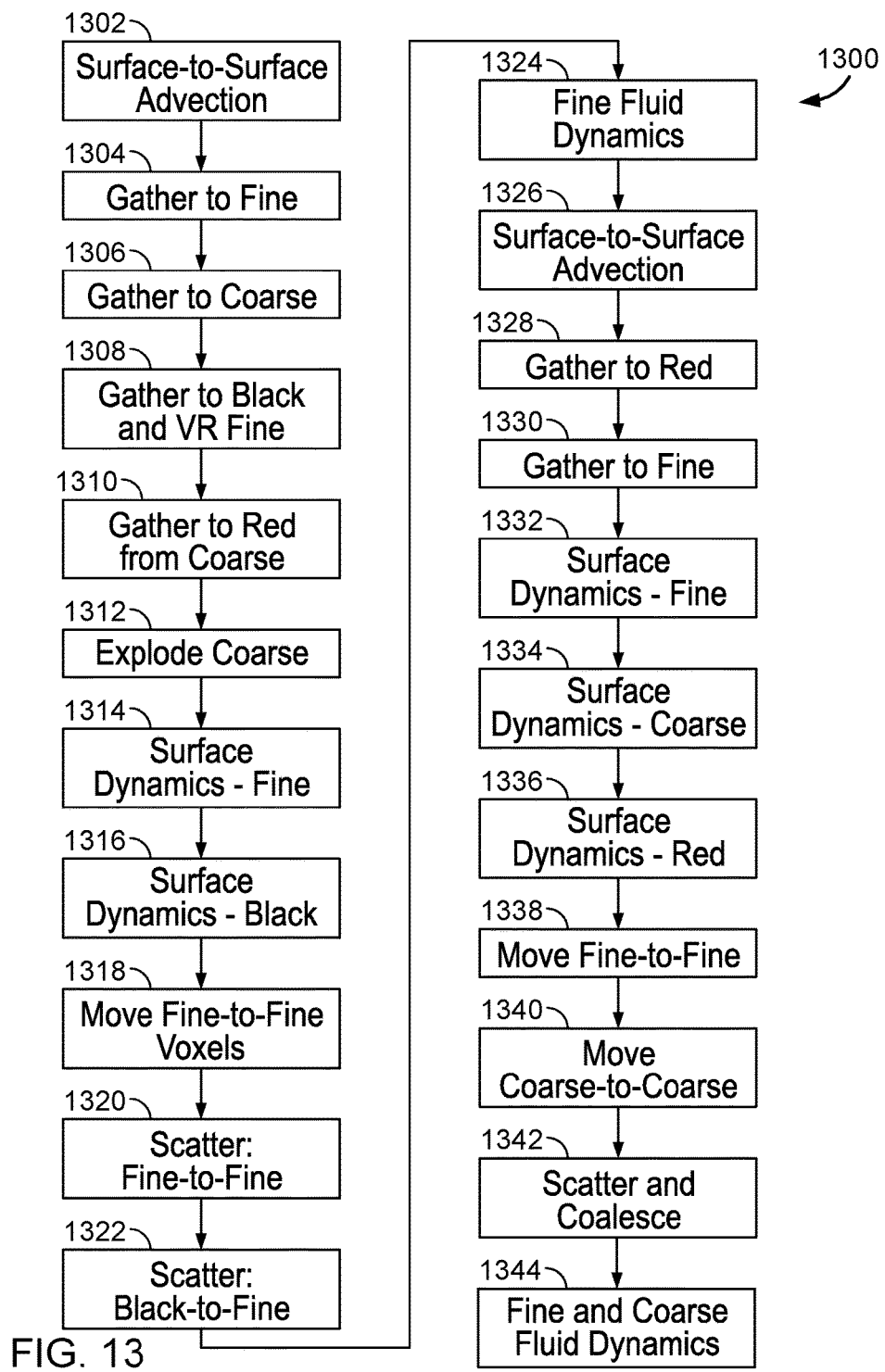
FIG. 13 is a flow chart of a procedure for simulating interactions with facets under variable resolution conditions.

Interactions with VR facets are handled using a variable resolution procedure 1300 illustrated in FIG. 13. Most steps of this procedure are carried out using the comparable steps discussed above for interactions with non-VR facets. The procedure 1300 is performed during a coarse time step (i.e., a time period corresponding to a coarse voxel) that includes two phases that each correspond to a fine time step. The facet surface dynamics are performed during each fine time step. For this reason, a VR interface facet $F_{\alpha IC}$ is considered as two identically sized and oriented fine facets that are referred to, respectively, as a black facet $F_{\alpha ICb}$ and a red facet $F_{\alpha ICr}$. The black facet $F_{\alpha ICb}$ is associated with the first fine time step within a coarse time step while the red facet $F_{\alpha ICr}$ is associated with the second fine time step within a coarse time step.

Initially, particles are moved (advected) between facets by a first surface-to-surface advection stage (step 1302). Particles are moved from black facets $F_{\alpha ICb}$ to coarse facets $F_{\beta C}$ with a weighting factor of $V_{-\alpha\beta}$ that corresponds to the volume of the unblocked portion of the coarse parallelepiped (FIG. 12, 1225) that extends from a facet $F_\alpha$ and that lies behind a facet $F_\beta$ less the unblocked portion of the fine parallelepiped (FIG. 12, 1245) that extends from the facet $F_\alpha$ and that lies behind the facet $F_\beta$. The magnitude of $c_i$ for a fine voxel is one half the magnitude of $c_i$ for a coarse voxel. As discussed above, the volume of a parallelepiped for a facet $F_\alpha$ is defined as:

$$V_{i\alpha} = |c_i n_\alpha| A_\alpha. \quad \text{Eq. (37)}$$

Accordingly, because the surface area $A_\alpha$ of a facet does not change between coarse and fine parallelepipeds, and because the unit normal $n_\alpha$ always has a magnitude of one, the volume of a fine parallelepiped corresponding to a facet is one half the volume of the corresponding coarse parallelepiped for the facet.

Particles are moved from coarse facets $F_{\alpha C}$ to black facets $F_{\beta ICb}$ with a weighting factor of $V_{\alpha\beta}$ that corresponds to the volume of the unblocked portion of the fine parallelepiped that extends from a facet $F_\alpha$ and that lies behind a facet $F_\beta$.

Particles are moved from red facets $F_{\alpha ICr}$ to coarse facets $F_{\beta C}$ with a weighting factor of $V_{\alpha\beta}$, and from coarse facets $F_{\alpha C}$ to red facets $F_{\beta ICr}$ with a weighting factor of $V_{-\alpha\beta}$.

Particles are moved from red facets $F_{\alpha ICr}$ to black facets $F_{\beta ICb}$ with a weighting factor of $V_{\alpha\beta}$. In this stage, black-to-red advections do not occur. In addition, because the black and red facets represent consecutive time steps, black-to-black advections (or red-to-red advections) never occur. For similar reasons, particles in this stage are moved from red facets $F_{\alpha ICr}$ to fine facets $F_{\beta IF}$ or $F_{\beta F}$ with a weighting factor of $V_{\alpha\beta}$, and from fine facets $F_{\alpha IF}$ or $F_{\alpha F}$ to black facets $F_{\alpha ICb}$ with the same weighting factor.

Finally, particles are moved from fine facets $F_{\alpha IF}$ or $F_{\alpha F}$ to other fine facets $F_{\beta IF}$ or $F_{\beta F}$ with the same weighting factor, and from coarse facets $F_{\alpha C}$ to other coarse facets $F_C$ with a weighting factor of $V_{C\alpha\beta}$ that corresponds to the volume of the unblocked portion of the coarse parallelepiped that extends from a facet $F_\alpha$ and that lies behind a facet $F_\beta$.

After particles are advected between surfaces, particles are gathered from the voxels in a first gather stage (steps 1304-1310). Particles are gathered for fine facets $F_{\alpha F}$ from fine voxels using fine parallelepipeds (step 1304), and for coarse facets $F_{\alpha C}$ from coarse voxels using coarse parallelepipeds (step 1306). Particles are then gathered for black facets $F_{\alpha IRb}$ and for VR fine facets $F_{\alpha IF}$ from both coarse and fine voxels using fine parallelepipeds (step 1308). Finally, particles are gathered for red facets $F_{\alpha IRr}$ from coarse voxels using the differences between coarse parallelepipeds and fine parallelepipeds (step 1310).

Next, coarse voxels that interact with fine voxels or VR facets are exploded into a collection of fine voxels (step 1312). The states of a coarse voxel that will transmit particles to a fine voxel within a single coarse time step are exploded. For example, the appropriate states of a coarse voxel that is not intersected by a facet are exploded into eight fine voxels oriented like the microblock of FIG. 4. The appropriate states of coarse voxel that is intersected by one or more facets are exploded into a collection of complete and/or partial fine voxels corresponding to the portion of the coarse voxel that is not intersected by any facets. The particle densities $N_i(x)$ for a coarse voxel and the fine voxels resulting from the explosion thereof are equal, but the fine voxels may have fractional factors $P_f$ that differ from the fractional factor of the coarse voxel and from the fractional factors of the other fine voxels.

Thereafter, surface dynamics are performed for the fine facets $F_{\alpha IF}$ and $F_{\alpha F}$ (step 1314), and for the black facets $F_{\alpha ICb}$ (step 1316). Dynamics are performed using the procedure illustrated in FIG. 11 and discussed above.

Next, particles are moved between fine voxels (step 1318) including actual fine voxels and fine voxels resulting from the explosion of coarse voxels. Once the particles have been moved, particles are scattered from the fine facets $F_{\alpha IF}$ and $F_{\alpha F}$ to the fine voxels (step 1320).

Particles are also scattered from the black facets $F_{\alpha ICb}$ to the fine voxels (including the fine voxels that result from exploding a coarse voxel) (step 1322). Particles are scattered to a fine voxel if the voxel would have received particles at that time absent the presence of a surface. In particular, particles are scattered to a voxel $N(x)$ when the voxel is an actual fine voxel (as opposed to a fine voxel resulting from the explosion of a coarse voxel), when a voxel $N(x+c_i)$ that is one velocity unit beyond the voxel $N(x)$ is an actual fine voxel, or when the voxel $N(x+c_i)$ that is one velocity unit beyond the voxel $N(x)$ is a fine voxel resulting from the explosion of a coarse voxel.

Finally, the first fine time step is completed by performing fluid dynamics on the fine voxels (step 1324). The voxels for which fluid dynamics are performed do not include the fine voxels that result from exploding a coarse voxel (step 1312).

The procedure 1300 implements similar steps during the second fine time step. Initially, particles are moved between surfaces in a second surface-to-surface advection stage (step 1326). Particles are advected from black facets to red facets, from black facets to fine facets, from fine facets to red facets, and from fine facets to fine facets.

After particles are advected between surfaces, particles are gathered from the voxels in a second gather stage (steps 1328-1330). Particles are gathered for red facets $F_{\alpha IRr}$ from fine voxels using fine parallelepipeds (step 1328). Particles also are gathered for fine facets $F_{\alpha F}$ and $F_{\alpha IF}$ from fine voxels using fine parallelepipeds (step 1330).

Thereafter, surface dynamics are performed for the fine facets $F_{\alpha IF}$ and $F_{\alpha F}$ (step 1332), for the coarse facets $F_{\alpha C}$ (step 1134), and for the red facets $F_{\alpha ICr}$ (step 1336) as discussed above.

Next, particles are moved between voxels using fine resolution (step 1338) so that particles are moved to and from fine voxels and fine voxels representative of coarse voxels. Particles are then moved between voxels using coarse resolution (step 1340) so that particles are moved to and from coarse voxels.

Next, in a combined step, particles are scattered from the facets to the voxels while the fine voxels that represent coarse voxels (i.e., the fine voxels resulting from exploding coarse voxels) are coalesced into coarse voxels (step 1342). In this combined step, particles are scattered from coarse facets to coarse voxels using coarse parallelepipeds, from fine facets to fine voxels using fine parallelepipeds, from red facets to fine or coarse voxels using fine parallelepipeds, and from black facets to coarse voxels using the differences between coarse parallelepipeds and find parallelepipeds. Finally, fluid dynamics are performed for the fine voxels and the coarse voxels (step 1344).

F. Porous Media Interface Model

The resistance of fluid flow through a porous media (PM) is commonly described by Darcy's law, which states that the pressure drop between two points is proportional to the flow rate "ρu" and the distance L between the two points:

$$p2-p1=\sigma L\rho u,$$

where "σ" is the PM resistivity. For flow through a PM with high porosity Φ close to 1, where porosity (between 0 and 1) is defined as the volume ratio of PM pores, the flow details at the interface between the PM and fluid generally may be neglected. However, for a PM with low porosity, the interface effect may be significant for certain types of applications, such as flow acoustics.

Figure 14:
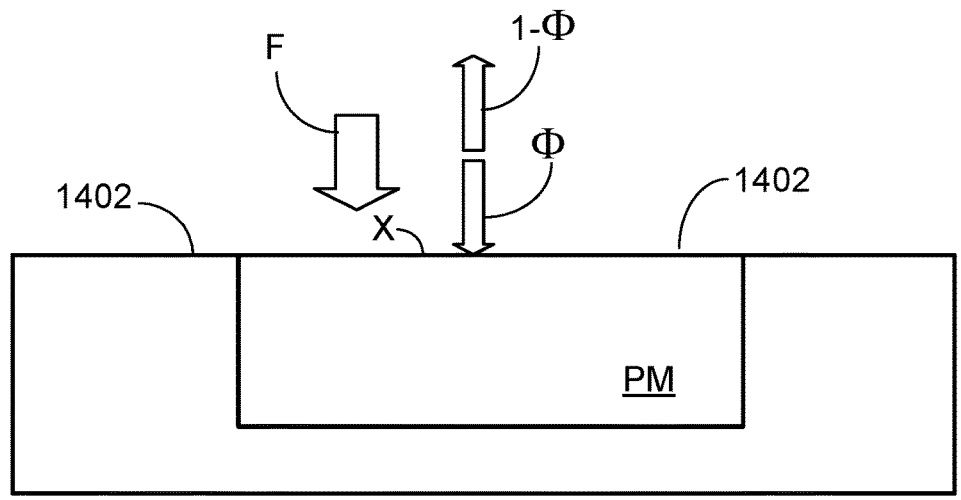
FIG. 14 is a schematic view of an exemplary porous media model.

For example, FIG. 14 illustrates a fluid F flowing toward an interface surface 1401 of a porous medium PM with porosity Φ. In a unit area 1402 on the interface surface 1401, the fraction of the surface that is penetrable and into which the fluid may flow is only Φ. By contrast, the fraction of the surface that is blocked by the PM solid structure is 1−Φ. As a result, only a Φ fraction of fluid F in each unit area on the surface can enter the PM, while the 1−Φ fractional part of the fluid F is blocked by the PM solid wall and stays on the fluid side of the interface surface 1401. In a kinetic approach, such as the LBM approach, such a partial fluid penetration can be realized efficiently. Since a fluid is represented by fluid particles, i.e., fluid fluxes, such as mass momentum energy fluxes, and particle distributions, the Φ fraction of particles is allowed to move into the PM during particle advection, and the 1−Φ fraction of particles is constrained by the PM solid wall boundary condition (BC). Here, the fluid particles may include particle distributions or fluxes of hydrodynamic and thermodynamic properties such as mass fluxes, momentum fluxes, and energy fluxes. Additionally, the fluid particles, or elements, may include properties such as mass, density, momentum, pressure, velocity, temperature, and energy. Moreover, the elements may be associated with any fluid, flow, or thermodynamic related quantity although not exhaustively identified herein.

Either a frictional wall (bounce-back or turbulent wall) BC or a frictionless wall BC can be applied. The fraction of particles allowed to move into the PM affects the mass and momentum conditions in the direction normal to the interface. For the tangential behavior at the interface, either a frictionless wall or a frictional wall BC can be applied (as is true for a "typical" wall boundary). A frictionless wall BC maintains the surface tangential fluid velocity on the wall by not modifying the flux of tangential momentum at the interface. A frictional wall BC does alter the tangential momentum flux to achieve, for example, a no-slip wall boundary condition, or a turbulent wall model. These wall BCs ensure that there is zero mass flux across the wall. When porosity Φ equals 1, the wall portion of the PM effectively disappears and the partial wall model ceases to have effect.

While the fraction of particles passing from the fluid into the PM is controlled by the porosity of the PM, particles leaving the PM can move freely because they encounter no solid obstacle from the fluid side. These particles together with the particles that were blocked from entering the PM form the total particle flow into the fluid side.

Figure 15:
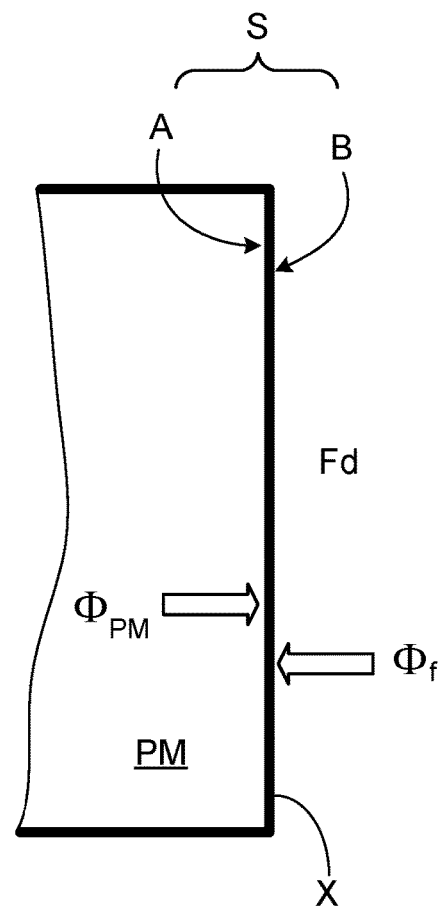
FIG. 15 is a schematic view of exemplary double-sided surfels.

The PM interface X can be described by so-called double-sided surface elements (i.e., surfels), as shown in FIG. 15. In such double-sided surfels, a set of paired surfels S form a double-layered surface having an inner surface A and outer surface B. The inner surface A interacts with the PM and the outer surface B interacts with fluid domain Fd. There is no gap between the inner and outer surfaces A and B. For convenience of computation, each inner surfel has the exact same shape and size as its paired outer surfel, and each inner surfel is only in touch with the paired outer surfel. The standard surfel gather and scatter scheme is performed on each side of the surface A, B, and with the condition that the $\Phi_f$ fraction of incoming particles from the fluid side F pass through to the PM side while all of the incoming particles $\Phi_{PM}$ from the PM side pass through to the fluid side F. Advantages of this approach include simplified handling of the complex PM interface, exact satisfaction of conservation laws, and easy realization of specified fluid boundary conditions on PM interface.

This approach, in effect, introduces a PM interface resistance which is not proportional to a PM thickness and therefore cannot be included in approximation of Darcy's law. The approach accounts for the flow details at the PM interface and improves simulation results of certain types of flow problems, such as the modeling of acoustic absorption.

Figure 16:
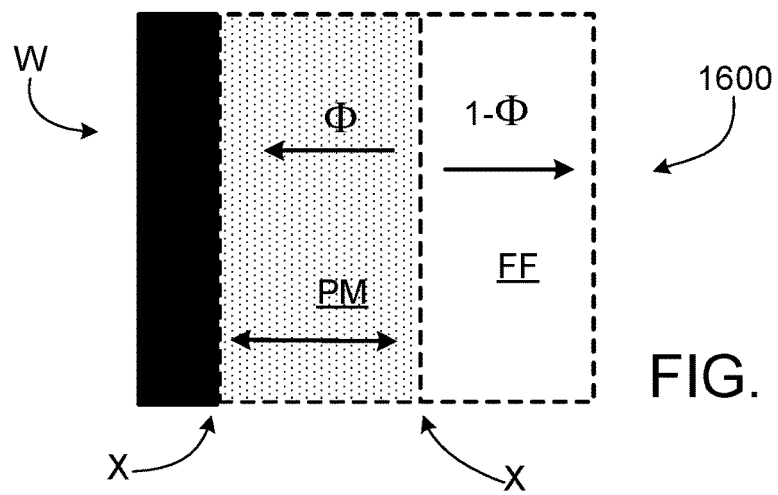
FIG. 16 is a schematic view of an exemplary system for modeling acoustic absorption.

For example, referring to FIG. 16, in a system 1600 for modeling acoustic absorption, a fluid flow region FF may be adjacent to a region PM occupied by a PM material with sound absorbing properties, with a PM interface X providing the interface between the fluid flow region FF and the region PM, and a wall interface Y providing the interface between the region PM and a wall W. The fluid flow region FF and the region PM can be, in effect, treated as two separate simulation spaces having different properties (e.g., in the region PM, an increased impedance may be used to account for the presence of the PM impedance), with movements Φ and 1−Φ between the two simulation spaces FF, PM being governed by the properties of the PM interface, as discussed above.

Acoustic absorption by porous materials is an important topic in acoustics engineering. At a microscopic scale, the propagation of sound in porous media is difficult to characterize because of the topological complexity of the materials. At a macroscopic scale, porous materials with high porosity can be treated as regions of fluid which have modified properties relative to air. Sound propagation in such media can be expressed in the form of two intrinsic, frequency-dependent, and volumetric properties of the material: the characteristic impedance and the complex acoustic wave number. Under certain assumptions, a given volumetric model for sound propagation in an absorbing material can be put in the form of locally-reacting, frequency-dependent, complex impedance at the interface between two different media. For example, impedance models, such as Boundary Element Methods (BEM), Finite Elements Methods (FEM), and Statistical Energy Analysis (SEA) methods, and are implemented as boundary conditions in the frequency domain.

For problems involving flow-induced noise, suitable Computational Fluid Dynamics (CFD) and/or Computational AeroAcoustics (CAA) numerical methods are non-linear and often time-explicit. For a time-explicit solution, time-domain surface impedance boundary conditions could likewise allow modeling of acoustic absorption due to porous materials. However, even when a time-domain surface impedance formulation can be derived, stability and robustness appear to be challenging problems to overcome. An exemplary approach includes modeling of absorbing materials as volumetric fluid regions, such that sound waves travel through the material and dissipate via a momentum sink. This is related to the method for macroscopic modeling of flow through porous media achieved by relating the momentum sink to the flow resistance of the material following Darcy's law. For an exemplary acoustic absorption modeling method, there is the question of how to determine the momentum sink to achieve a desired absorption behavior. If the acoustic absorption is governed (or at least dominated) by the same physical mechanisms as the flow resistivity, then the same momentum sink behavior used to achieve the correct flow resistivity for a particular porous material should also achieve the correct acoustic absorption for that material. This approach should be valid for any passive and homogeneous porous material. Moreover, numerical stability problems should be removed since the impedance is realized in a way that is inherently well-posed (i.e. passive, causal, and real conditions are satisfied).

According to this exemplary approach, a time-explicit CFD/CAA solution method based on the Lattice Boltzmann Method (LBM), which has evolved over the last two decades as an alternative numerical method to traditional CFD, may be used. Unlike methods based on discretizing the macroscopic continuum equations, LBM starts from a "mesoscopic" Boltzmann kinetic equation to predict macroscopic fluid dynamics. The resulting compressible and unsteady solution method may be used for predicting a variety of complex flow physics, such as aeroacoustics and pure acoustics problems. A porous media model is used to represent the flow resistivity of various components, such as air filters, radiators, heat exchangers, evaporators, and other components, which are encountered in simulating flow, such as through HVAC systems, vehicle engine compartments, and other applications.

Figure 17A:
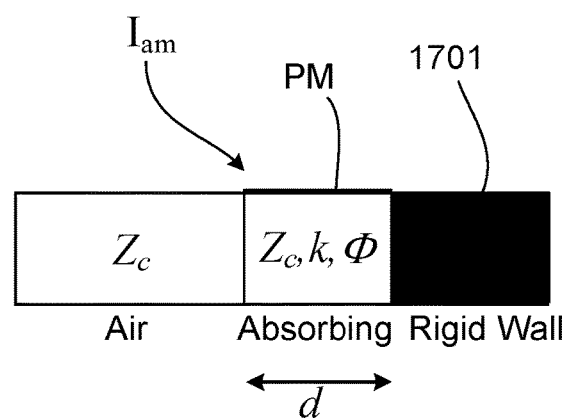
FIGS. 17A and 17B are schematic views of other exemplary porous media models.

The propagation of sound waves inside a homogeneous and passive absorbing material with a porosity close to Φ=1 is macroscopically fully characterized by the material's characteristic impedance $Z_c(\omega)$ and complex wave number $k(\omega)$. By performing measurements on various porous and fibrous materials, many semi-empirical models are derived, such as the Delany-Bazley or Allard-Champoux 3-parameter models. For example, the Allard-Champoux 3-parameter model is given by:

$$Z_c(\omega) = \rho_0 c_0 \lfloor 1 + 0.008127 X^{-0.75} - j0.001228 X^{-0.73} \rfloor \quad \text{(Eq. 38)}$$

$$k(\omega) = \frac{\omega}{c_0}[1 + 0.085787 X^{-0.70} - j0.174949 X^{-0.59}] \quad \text{(Eq. 39)}$$

where $\rho_0$ is the density of air, $c_0$ the sound speed in air, and X is a dimensionless parameter equal to $X=\rho_0\omega/2\pi\sigma$ with $\sigma$ the flow resistivity. This model is considered valid for 0.01<X<0.1. For the situation of a layer of porous material PM of uniform thickness "d" backed by an impervious rigid wall 1701, as shown in FIG. 17A, the complex impedance $Z_s(\omega)$ at normal incidence at the air/material interface $I_{am}$ is:

$$Z_s(\omega) = -j\frac{1}{\phi}Z_c(\omega)\cos(k(\omega) \cdot d) \quad \text{(Eq. 40)}$$

Figure 17B:
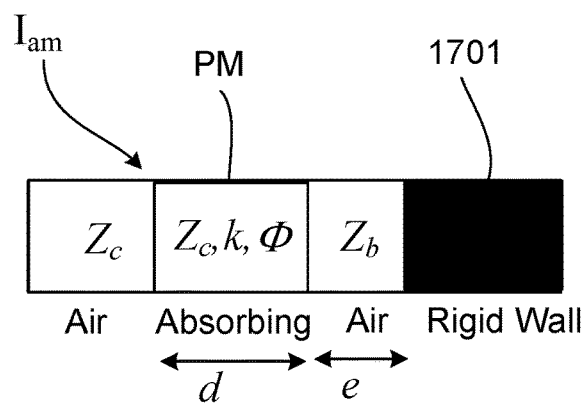

As shown in FIG. 17B, in which there is a layer of air of thickness "e" in between the porous material PM and the rigid wall 1701, the expression for $Z_s(\omega)$ becomes:

$$Z_s(\omega) = -\frac{1}{\phi}Z_c(\omega)\frac{-jZ_a(\omega)\cot(k(\omega) \cdot e) + Z_c(\omega)}{Z_a(\omega) - jZ_c(\omega)\cot(k(\omega) \cdot e)} \quad \text{(Eq. 41)}$$

with $Z_a(\omega)=-jZ_0\cdot\cot(k_0(\omega)\cdot d)$, $k_0(\omega)=\omega/c_0$.

The complex surface impedance $Z_s(\omega)$ is expressed as a function of its real and imaginary parts, the resistance $R(\omega)$ and the reactance $X(\omega)$, respectively. For passive materials, characterized by $R(\omega)>0$ (i.e. positive resistance), the material absorption coefficient $\alpha(\omega)$ is defined by:

$$\alpha(\omega) = 1 - \left|\frac{1-Z_s}{1+Z_s}\right|^2 \quad \text{(Eq. 42)}$$

The surface impedance can be measured in an impedance tube using a two-microphone method as described below.

The LBM-based method can be used to compute unsteady flow and the generation and propagation of acoustics waves. In LBM, external forces can be included in the fluid dynamics by altering the local-instantaneous particle distributions during the collision step. The external force applied per unit time effectively becomes a momentum source/sink. This technique can be used, for example, to model buoyancy effects due to gravity. The method implements a porous media model by applying an external force based on Darcy's law for flow resistivity as a function of flow velocity. The effect of a porous medium on the flow is achieved by removing an amount of momentum at each volumetric location of the porous region such that the correct pressure gradient is achieved, resulting in the correct overall pressure drop.

Figure 18:
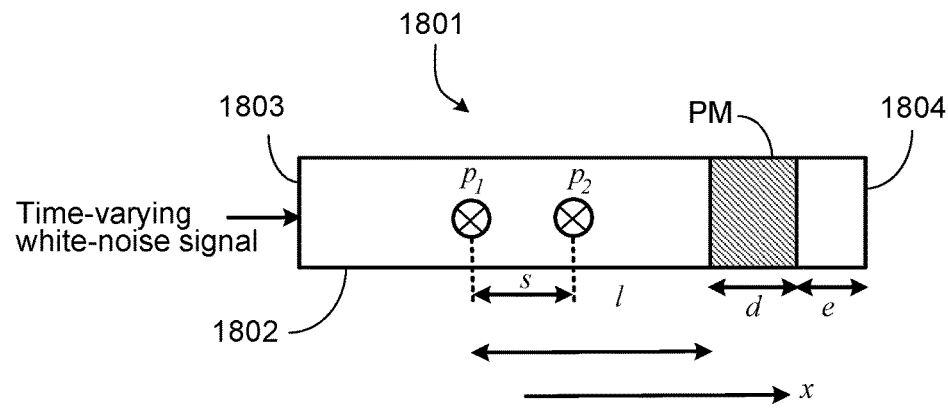
FIG. 18 is a schematic view of another exemplary porous media model.

To assess the effect of the porous media model on acoustics propagation, a 3D circular impedance tube 1801, as shown in FIG. 18, can be simulated. For example, the tube dimensions are length L=0.772 m and diameter D=0.0515 m, and the frequency range for valid usage of the tube 1801 may be, for example, 100 Hz-3000 Hz. The tube walls 1802 are presumed as rigid and frictionless, and a time-varying pressure boundary condition representing white noise is applied at the inlet 1803. The layer of thickness "d" represents an absorbing material and is a porous media region PM, characterized by flow resistivity $\sigma_x$ in the x-direction and infinite resistance in the other directions. An air layer of thickness "e" can be included between the porous media region PM and the right-hand side rigid wall 1804. Uniform grid resolution may be used, for example, with 30 points per wavelength at f=3000 Hz, i.e. $\Delta x$=1.7 mm, ensuring low numerical dissipation of acoustic waves. The time step is $\Delta t$=4.56×10$^{-6}$ s and the simulations are run for a time of T=2 s, which was observed to be a sufficient physical time for the results to evolve beyond the startup transient period and provide meaningful statistics.

Pressure time histories are recorded inside the tube at two virtual microphones $p_1(x_1,t)$ and $p_2(x_2,t)$. Using $x_1-x_2=s$ and $x_1=l$, the surface complex impedance at x=0 is given by the following expression:

$$\frac{Z_s}{Z_0} = j\frac{h_{12}\sin(kl) - \sin[k(l-s)]}{\cos[k(l-s)] - h_{12}\cos(kl)} \quad \text{(Eq. 43)}$$

with $h_{12}$ the complex transfer function between $p_1$ and p2, and wave number $k=\omega/c_0=2\pi f/c_0$. From this expression, acoustic resistance, reactance, and absorption coefficient can be derived and compared to semi-empirical models and experimental results.

TABLE 1

| Configuration | d (mm) | e (mm) | $\sigma_x$ (rayls/m) | Equivalent material type |
|---|---|---|---|---|
| A | 0 | 0 | 0 | None (Air) |
| B | 26.5 | 0 | 23150 | Felt |
| C | 26.5 | 48.5 | 23150 | Felt |
| D | 26.5 | 120.0 | 23150 | Felt |
| E | 26.5 | 0.0 | 14150 | Foam |
| F | 26.5 | 120.0 | 14150 | Foam |
| G | 26.5 | 0 | 200 | Air filter |

Figure 19:
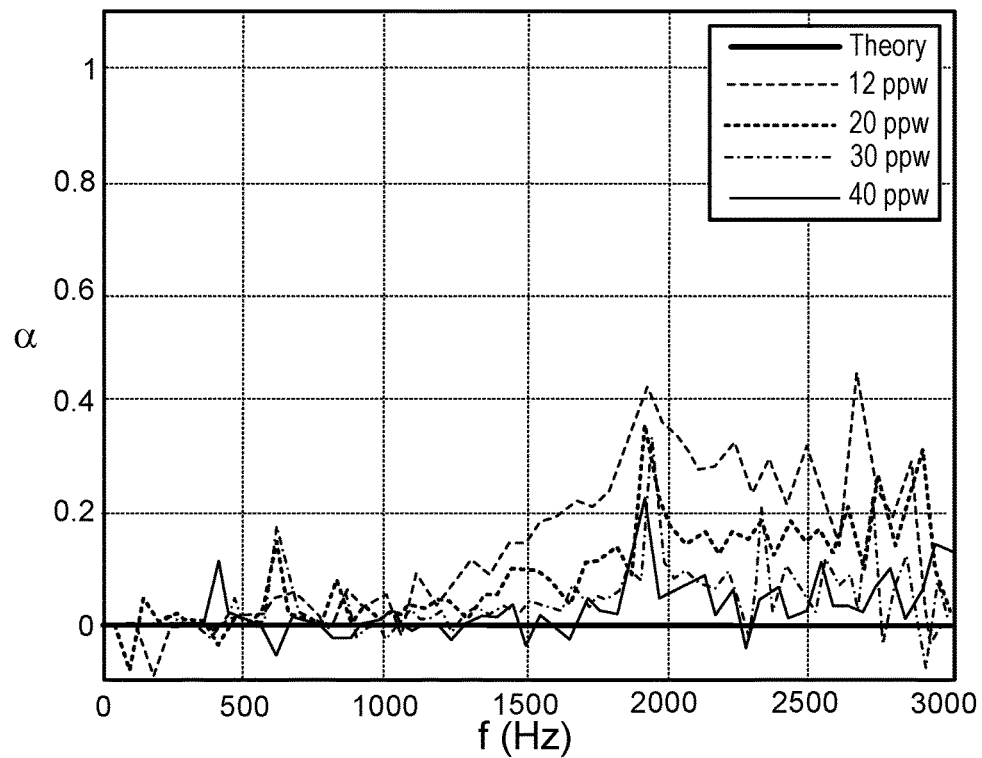
FIG. 19 illustrates absorption coefficients as a function of frequency.

Simulated configurations, as shown in Table 1, are compared to the Allard-Champoux model (Equations 38 and 39). As shown by Configuration A (no absorbing layer), the convergence of the results with respect to the grid resolution and characterization of any residual absorption of the numerical system result. As shown in FIG. 19 for Configuration A, residual absorption is close to zero at low frequencies, while at high frequencies (f>1500 Hz), some absorption is measured for the coarser resolutions. This is related to increasing numerical dissipation of acoustics in both the air and at the solid boundaries as the grid is made coarser. For 40 points per wavelength (ppw), the residual absorption is less than 5% for f<3000 Hz, which may be considered to be satisfactory. The peaks at 1900 Hz and 2650 Hz are related to poles of Equation 42, and correspond to numerical and signal processing artifacts. As shown by Configuration G, which corresponds to a typical air filter in an automotive HVAC system, with a flow resistivity $\sigma_x$=100 rayls/m.

Figure 20:
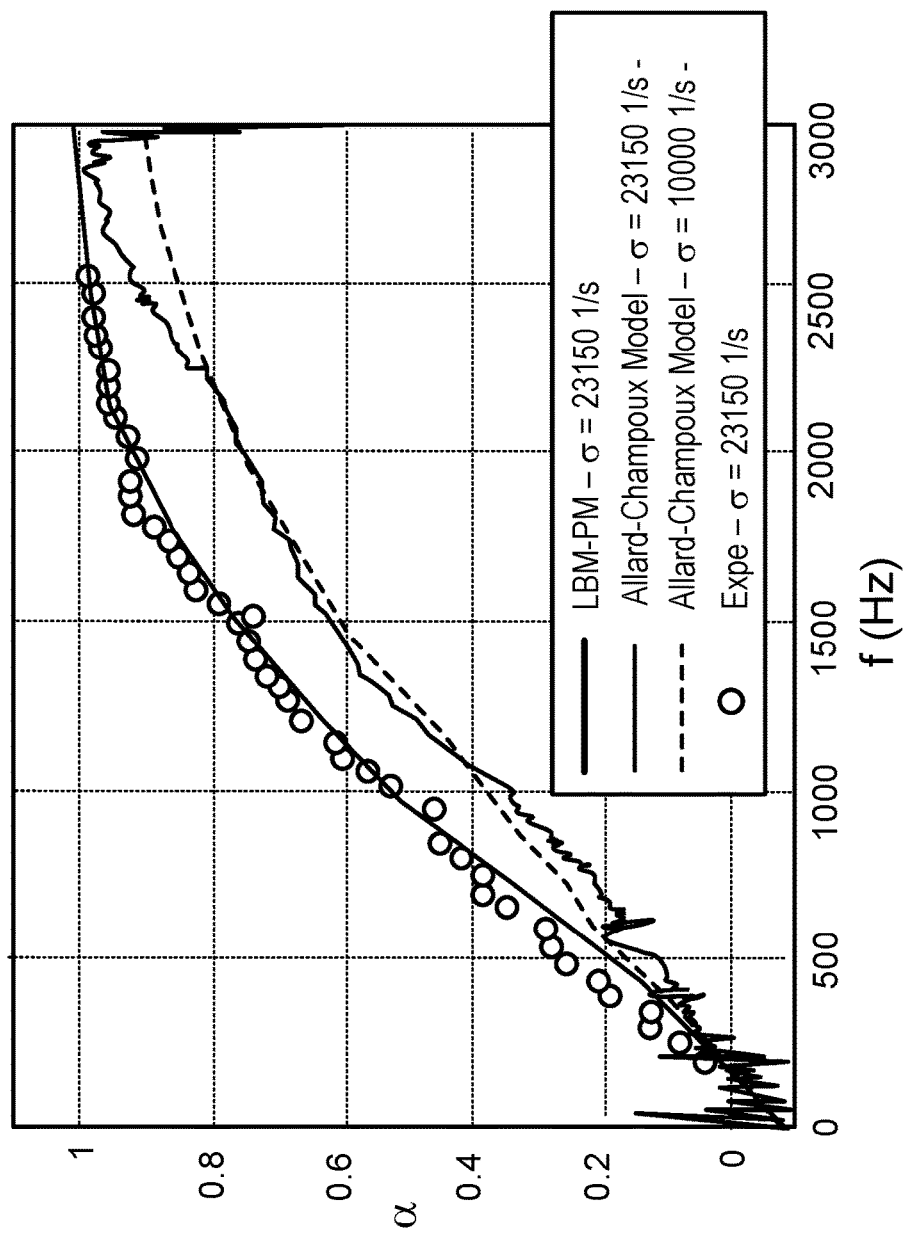
FIGS. 20-22 illustrate absorption coefficients as functions of frequency.
Figure 21:
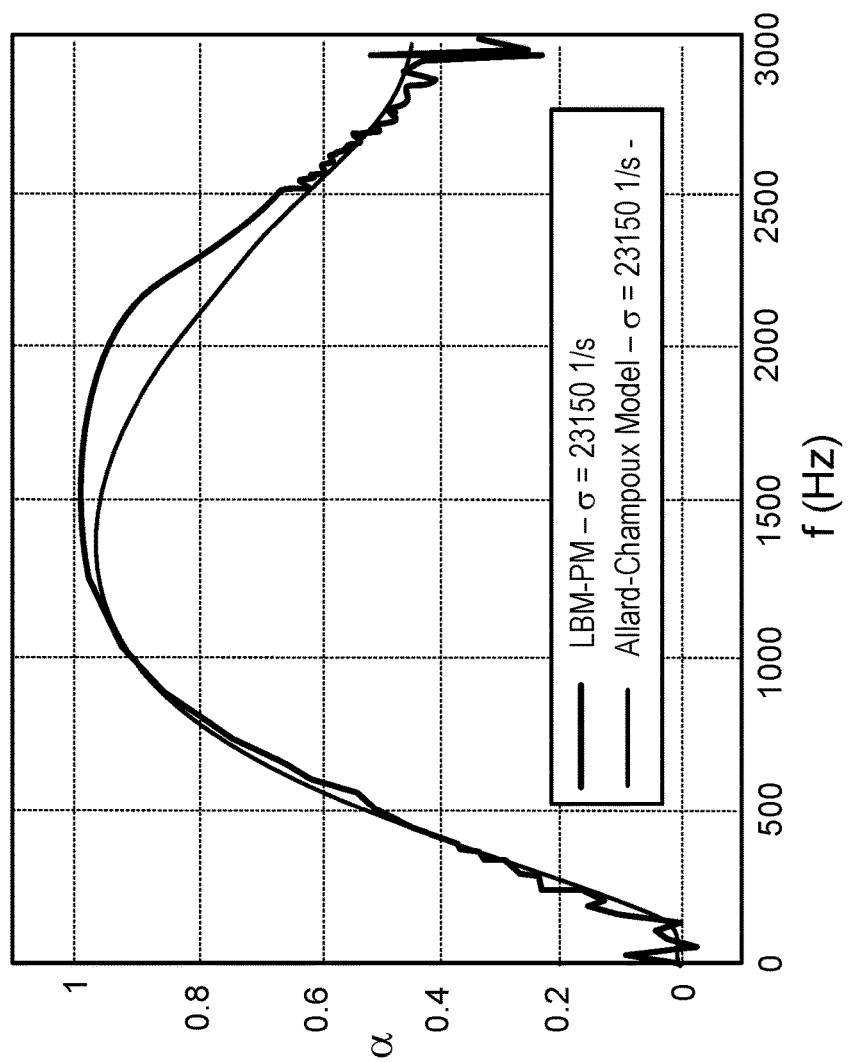
Figure 22:
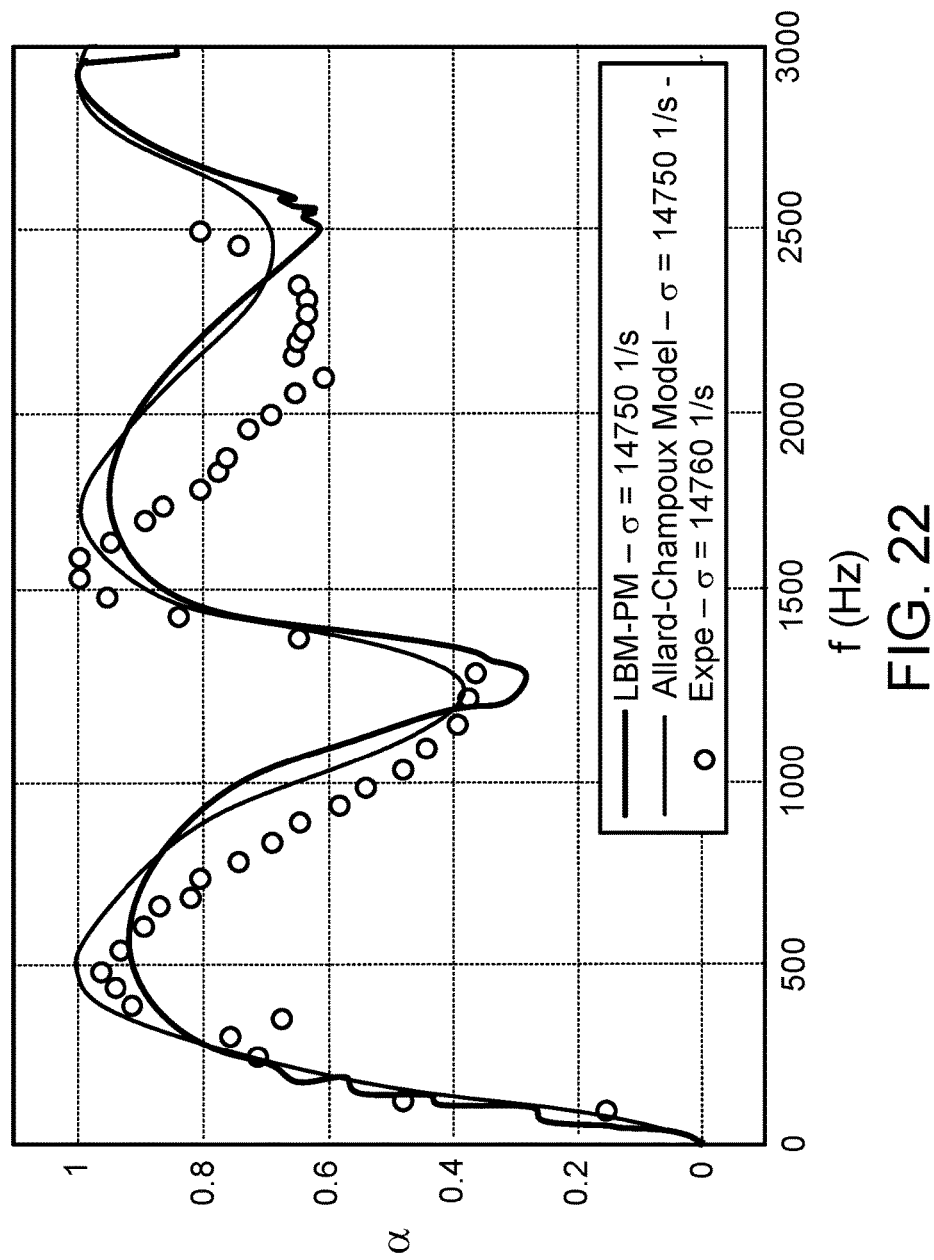

In FIGS. 20-22, some exemplary preliminary results are shown with a 30 ppw simulation with LBM-PM model results, Allard-Champoux model results, and experimental data. In FIG. 20 for Configuration B, the thickness "d" of the PM is 26.5 mm, the thickness "e" of the air is 0.0 mm, and flow resistivity "$\sigma$" is 23150 rayls/m. In FIG. 21 for Configuration C, the thickness "d" of the PM is 26.5 mm, the thickness "e" of the air is 48.5 mm, and the flow resistivity "$\sigma$" is 23150 rayls/m. In FIG. 22 for Configuration D, the thickness "d" of the PM is 120.0 mm, the thickness "e" of the air is 48.5 mm, and the flow resistivity "$\sigma$" is 23150 rayls/m. Here, as demonstrated by FIGS. 20-22, the validity of the Allard-Champoux model is confirmed, and the simulation results also correlate well to the LBM-PM model and to the experimental results. The frequency dependence of the absorption coefficient is well-captured for each Configuration, including non-monotonic behavior.

For configuration G, corresponding to a typical air filter in a HVAC system, for example, the acoustic absorption is relatively small. Thus, the LBM-PM model approach correctly captures both flow and acoustic effects, even for a material that has a significant flow resistance effect but a negligible effect on acoustics.

Accurate prediction of fan noise is an important issue in the field of aeroacoustics. As vehicle manufacturers seek to reduce the noise levels experienced by passengers, the noise due to the heating, ventilation, and air conditioning (HVAC) system becomes a target for improved acoustic performance. The HVAC system is complex, consisting of a blower and mixing unit coupled to many ducts through which air is transported to various locations, including faces and feet of front and rear passengers, as well as windshield and side-glass defrost. The blower must supply sufficient pressure head to achieve desired air flow rates for each thermal comfort setting. Noise is generated due to the blower rotation, and by the turbulent air flow in the mixing unit, through the twists and turns of the ducts, and exiting the registers (ventilation outlets). When designing an HVAC system it is difficult to predict whether noise targets will be met, and to find the best compromise between flow, thermal, and acoustic performance while meeting packaging constraints. The effects of integrating the HVAC system into the vehicle, which changes the performance relative to the test bench, must also be accounted for.

Figure 23:
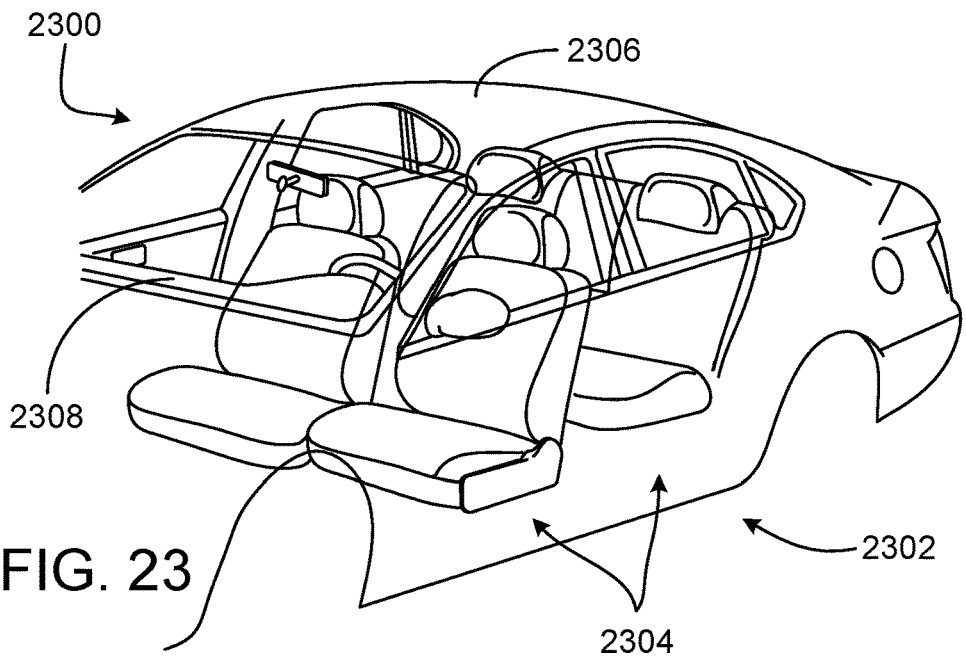
FIG. 23 illustrates an interior of a vehicle.

For example, as exemplified in FIG. 23, noise heard by passengers due to the HVAC system of a vehicle 2300, which involves many sources and paths, may be the noise absorbed at an interior cabin 2302. For example, the noise may result from a blower of the vehicle that includes a radial fan which generates noise from the interaction of the moving blades with the surrounding, air, and the impact of the moving air on nearby static components, such as seats 2304 and interior roof 2306 of the vehicle. This fan noise is acoustically propagated through the complex network of ducts, out of the registers, and into the interior cabin 2302. The duct and mixing unit flow noise sources are generated mainly by flow separations and vortices resulting from the detailed geometric features, and are also acoustically propagated through the system. Noise due to the flow exiting the registers depends on the fine details of the grill and its orientation, and the resulting outlet jets which mix with the ambient air and may impact surfaces, such as the windshield 2308 (e.g., for defrost). Therefore, the requirements for numerical flow-acoustic predictions may be accomplished using the exemplary modeling, as detailed above, whereby the interior cabin 2302 may be considered a fluid of a first volume and the static components and surfaces within the interior cabin 2302 may be considered a second volume occupied by a porous medium. By implementing the exemplary modeling, complex geometries may be investigated to provide predictions of the fan and flow induced noise sources, and their acoustic propagation all the way through the system to the locations of the passengers at the interior cabin 2302 of the vehicle 2300.

The exemplary modeling provides accurate numerical noise prediction for fully detailed automotive HVAC systems, such as accurate predictions of the complex flow structures, corresponding noise sources, and resulting propagated acoustics to the passenger head space locations, including effects of geometric details throughout the integrated system. The transient flow characteristics and acoustics can be determined, including the rotating fan flow and noise, as well as direct prediction of acoustic propagation throughout the system. The exemplary modeling can obtain early noise assessment of proposed designs and evaluate potential design options, and/or diagnose and improve noise problems on an existing design. In addition, the exemplary model provides visualization capabilities to allow identification and insight into sources of noise, including band-filtered pressure analyses to isolate phenomena at specific frequency bands of interest. Predicted spectra at passenger locations can be converted to audio files for comparative listening to the effects of various design options. The exemplary modeling also provides accurate HVAC system pressures, flow rates, and thermal mixing behavior—hence it can be used to assess multi-disciplinary design tradeoffs to design the HVAC system with optimal aero, thermal, and acoustic performance.

In another example, the operation of transportation vehicles and heavy machinery results in sound propagated through the air which reaches people in the surrounding areas and is known as community (or environmental) noise. Increased usage of air and ground transportation has brought significant increases in community noise, with proven adverse health effects. This noise pollution is now considered a serious problem and is government regulated in most countries, with the specific regulations varying by industry and vehicle type as well as from country to country. It is important to design products that do not exceed regulated noise targets, which involve the sound levels reaching an observer at a specified location or distance relative to the moving vehicle or stationary equipment. To assess whether a target will be met, key sources of noise generated by turbulent flow or mechanical vibration in the near-field and the resulting sound propagation to the observer in the far-field must be determined.

A major part of designing towards meeting noise targets is to assess and reduce noise sources while dealing with the multitude of other design constraints. Experimental testing challenges also include wind tunnel space limitations for extending measurements to the far-field, and relating stationary source wind tunnel measurements to the real life moving source scenario. A key challenge faced by both experimental and numerical techniques in the identification of flow-induced noise sources is that sound propagated to the far-field consists of pressure perturbations, which may be very small relative to the turbulent pressure fluctuations in the near-field source region. Hence, according to the exemplary modeling, as detailed above, predictions of both the noise sources and the resulting acoustic propagation may be accomplished to achieve highly accurate transient flow behavior, and sufficiently low dissipation and dispersion, to resolve small amplitude fluctuations over the frequency range of interest. Moreover, in typical applications, such as aircraft or train certification, the far-field noise target involves large distances making it impractical to extend the computational domain to include both the source region and the observer.

Figure 24:
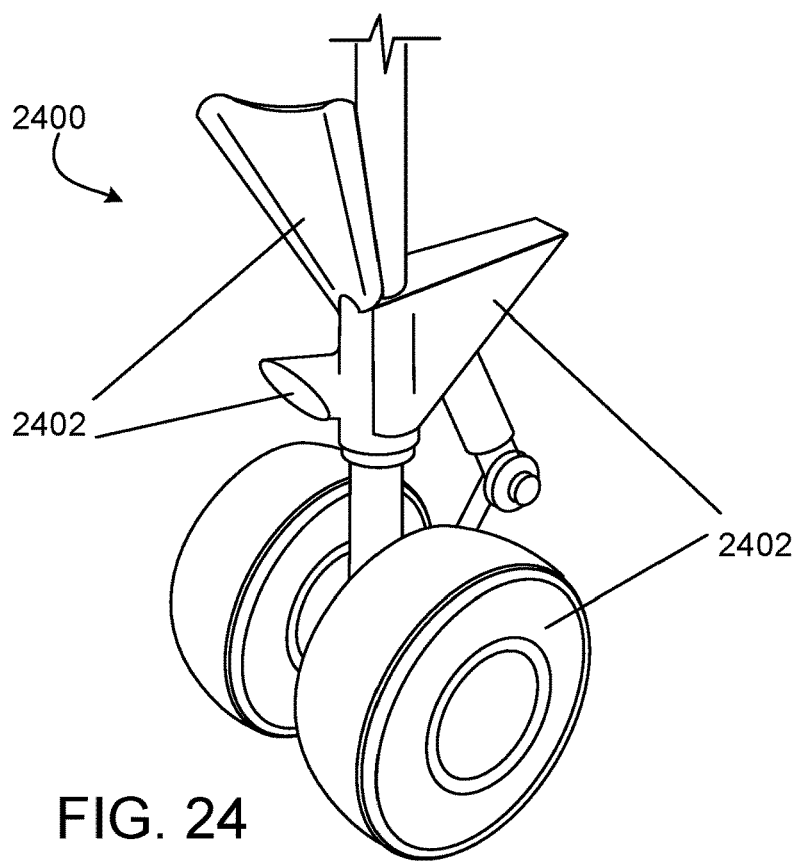
FIG. 24 illustrates an aircraft landing system.

To predict far-field noise, the exemplary modeling may be used to provide detailed flow behavior and resulting near-field sources for either a vehicle component of interest, such as an aircraft landing gear assembly 2400, as shown in FIG. 24, or a complete vehicle. According to the exemplary modeling, transient solutions accurately predict the complex time-dependent flow structures, corresponding noise sources, and can accommodate the required realistic detailed geometry, such various components 2402 of the aircraft landing gear assembly 2400. The results can be coupled to a far-field propagation module to easily and efficiently predict the far-field noise at any location, whereby the region surrounding the aircraft landing gear assembly 2400 may be considered a fluid of a first volume and regions between the components 2402 of the aircraft landing gear assembly 2400 may be represented as a second volume occupied by a porous medium. The exemplary modeling allows for early noise assessment and optimization, including noise certification evaluation (e.g. using the Evolution of Perceived Noise Level EPNL metric) before a final prototype is built. In addition, visualization of the exemplary modeling can provide insight into sources of noise, including band-filtered pressure analyses to isolate phenomena at specific frequency bands of interest, for example to find the cause of a peak observed in a far-field spectrum.

In some implementations, the PM model may account of tortuosity of the medium. For example, it may be desirable to model the acoustic behavior of sound waves as the waves propagate through a porous medium. Modelling this behavior can be difficult to when the exact geometry of the porous medium is unknown. (e.g. when modeling the propagation of acoustic waves through, for example, foam padding).

Figure 25:
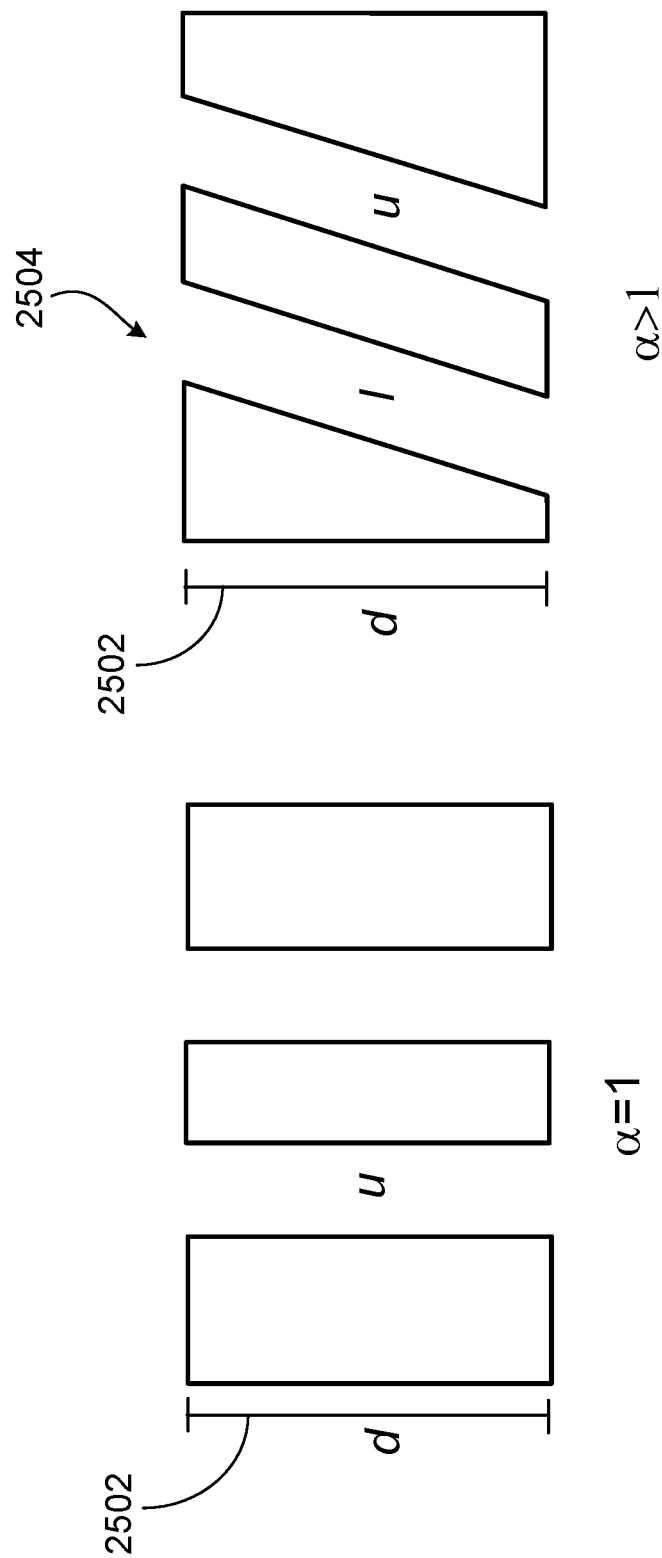
FIG. 25 illustrates an example of tortuosity in a porous medium.

Tortuosity $\alpha(\geq 1)$ can be defined as $$\alpha = \left(\frac{l}{d}\right)^2 \quad \text{(Eq. 44)}$$

or $$\alpha = \frac{c_0^2}{c_s^2} \quad \text{(Eq. 45)}$$

as shown in FIG. 25, where l is streamline length 2504, d is the thickness 2502 of porous media (PM) domain, $c_0$ is the sound speed of fluid in the void space, $c_s$ is the sound speed in PM.

Since a tortuous path of fluid particles inside PM is longer than the PM thickness, the sound wave needs more time to pass through PM and therefore the sound speed inside PM is reduced.

Tortuosity effects in a porous medium can be accounted by rescaling of the time variable which also results in rescaling of the dynamic variables inside PM:

$$t' = \sqrt{\alpha} t \quad \text{(Eq. 46)}$$

The Lattice Boltzmann Model (LBM) for the PM is equivalent to solving a Navier-Stokes (NS) equations with a PM resistance force:

$$\frac{\partial \rho}{\partial t} + \nabla \cdot (\rho \vec{u}) = 0. \quad \text{(Eq. 47)}$$

-continued $$\frac{\partial \rho \vec{u}}{\partial t} + \nabla \cdot (\rho \vec{u}\vec{u}) = -\nabla p - \vec{\sigma} \cdot \rho \vec{u} + \nabla \cdot \{\mu[\nabla \vec{u} + (\nabla \vec{u})^T]\}$$

Where $\vec{\sigma}$ is a PM resistance tensor of order 2. For regular fluid $\vec{\sigma}$ is zero, therefore the same LBM solver can be applied to both regular fluid and PM.

The following example illustrates the time scaling, a 1D (3D extension is straightforward) small perturbation assumption for acoustic analysis. The system (47) can be linearized to $$\frac{\partial \rho}{\partial t} = -\rho_0 \frac{\partial u}{\partial x}$$ (Eq. 48)

$$\rho_0 \frac{\partial u}{\partial t} = -\frac{\partial \rho}{\partial x} RT - \sigma \rho_0 u$$

Here, u is the fluid velocity, p is static pressure, $\rho_0$ is characteristic density and $\sigma$ is the PM resistance.

Let: $t=t'/\sqrt{\alpha}$ and $u=\sqrt{\alpha}u'$, the system (48) becomes:

$$\frac{\partial \rho}{\partial t'} = -\rho_0 \frac{\partial u'}{\partial x}$$ (Eq. 49)

$$\rho_0 \frac{\partial u'}{\partial t'} = -\frac{1}{\alpha}\frac{\partial \rho}{\partial x} RT - \frac{\sigma}{\sqrt{\alpha}}\rho_0 u'$$

Comparison of the time-scaled system (49) with (48) shows that if the variables are scaled as follows:

$$u'=u\sqrt{\alpha}, p'=p/\alpha, \sigma'=\sigma/\sqrt{\alpha}$$ (Eq. 50)

the system (49) has the same form as the system (48), meaning that the same solver of (48) can be used to solve (49).

Considering the sound speed calculation $c=\sqrt{\gamma p/\rho}=\sqrt{\gamma RT}$ where R is the gas constant and $\gamma$ the specific heat ratio, the pressure scaling $p'=p/\alpha$ results in a sound speed ratio $$c_s=c_0/\sqrt{\alpha}$$ (Eq. 51)

that can be set up using a desired value of tortuosity $\alpha$ (see Eq. (45)).

In LBM, pressure and therefore rescale sound speed can be rescaled by introducing a body force. The following algorithm can be used to rescale the pressure. The lattice Boltzmann equation is written as:

$$f_i(x+c_i\Delta t, t+\Delta t) = f_i(x, t) -$$ (Eq. 52)
$$\omega[f_i(x,t) - f_i^{eq}(x,t)] + [g_i(x+c_i\Delta t, t+\Delta t) - g_i(x,t)]$$

$$g_i = \rho w_i \left[1 - \frac{RT}{\alpha T_0}\right]$$

where $c_i$, $f_i$, $f_i^{eq}$ are discrete particle velocity, particle distribution state of velocity $c_i$, and equilibrium state respectively. The $g_i$ terms in Eq. (52) introduce a body force that rescale pressure to $p=R\rho T/\alpha$. Without the $g_i$ terms Eq. (52) recovers standard LBM with pressure $p=\rho T_0$, where $T_0$ is the lattice characteristic temperature.

The algorithm for the pressure rescaling Eq. (52) is
1. Collide, $f'_i=f_i-\omega[f_i-f_i^{eq}]$.
2. Deduct the local force term, $g_i(x, t)$.
3. Advect.
4. Add the local force term, $g_i(x, t)$.
5. Compute the mass and momentum and temperature at $t+\Delta t$.
6. Evaluate the new force term $g_i(x, t+\Delta t)$ using latest temperature.
7. Sum the difference of $g_i(x, t+\Delta t)-g_i(x, t)$ over all moving states, and add the sum to the stop state to conserve total mass.
8. Repeat steps 1 to 7.

Exiting algorithms deal with single region with the same equation of state (pressure expression), while the system described herein can support multi regions of different equations of state, e.g., $p=R\rho T$ in regular fluid and $p=R\rho T/\alpha$ in PM.

Figure 26:
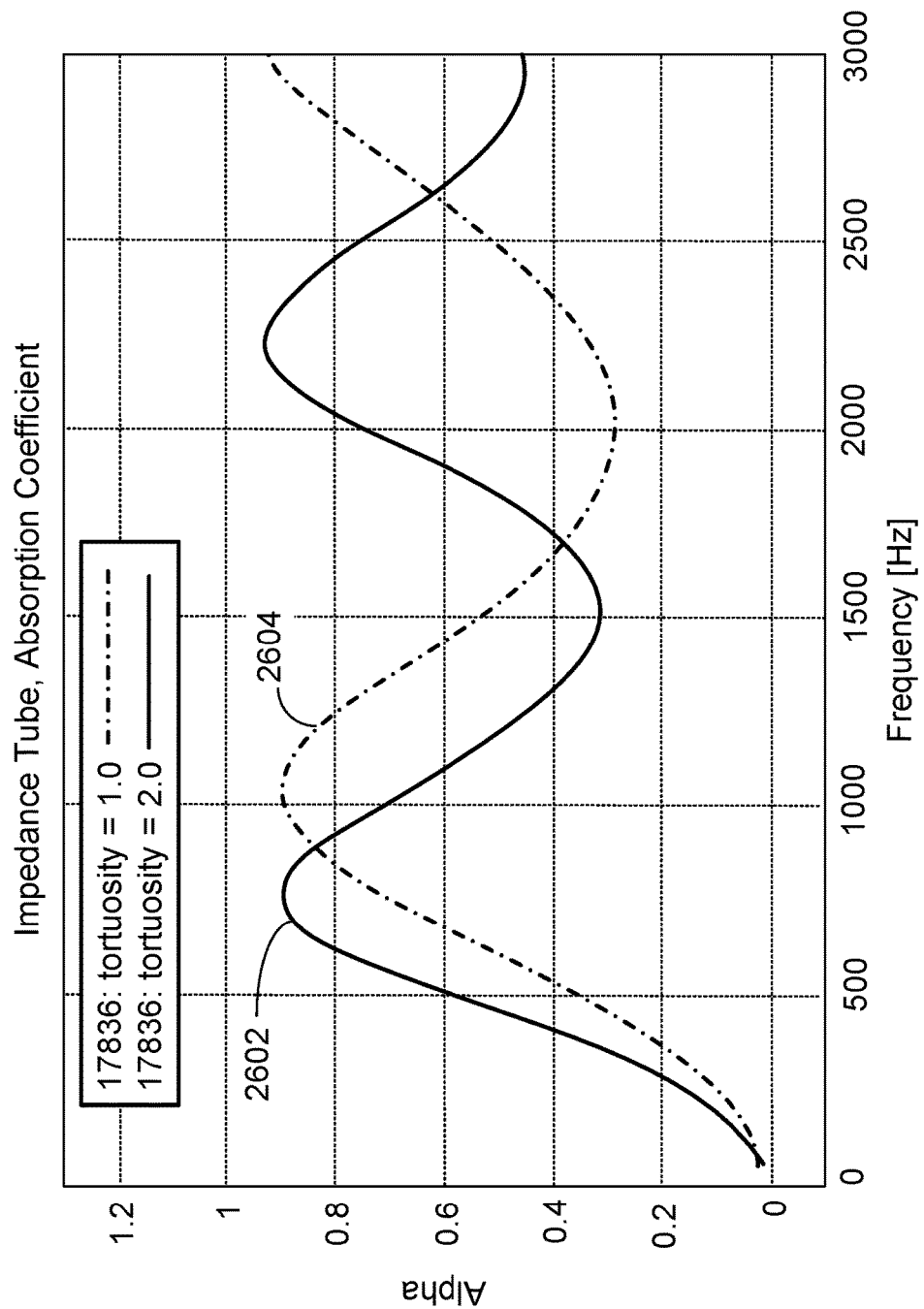
FIG. 26 shows the effects of tortuosity on the curve of absorption coefficient versus frequency for the NASA ceramic liner porous media.

FIG. 26 shows the effects of tortuosity on the curve of absorption coefficient versus frequency for the NASA ceramic liner porous media. The liner is composed of straight micro circular tubes with porosity of 0.57 and tortuosity of 1.0. The first line 2602 and second line 2604 are PowerFLOW (registry 17836) results with the tortuosity equal to 2.0 and 1.0 respectively. Compared with the second line 2604, the frequency corresponding to the first line 2602 curve is scaled by the factor of $1/\sqrt{2}$, which agrees with the tortuosity of 2 for this case and is in full agreement with the time scaling given by Eq. (46).

Figure 27:
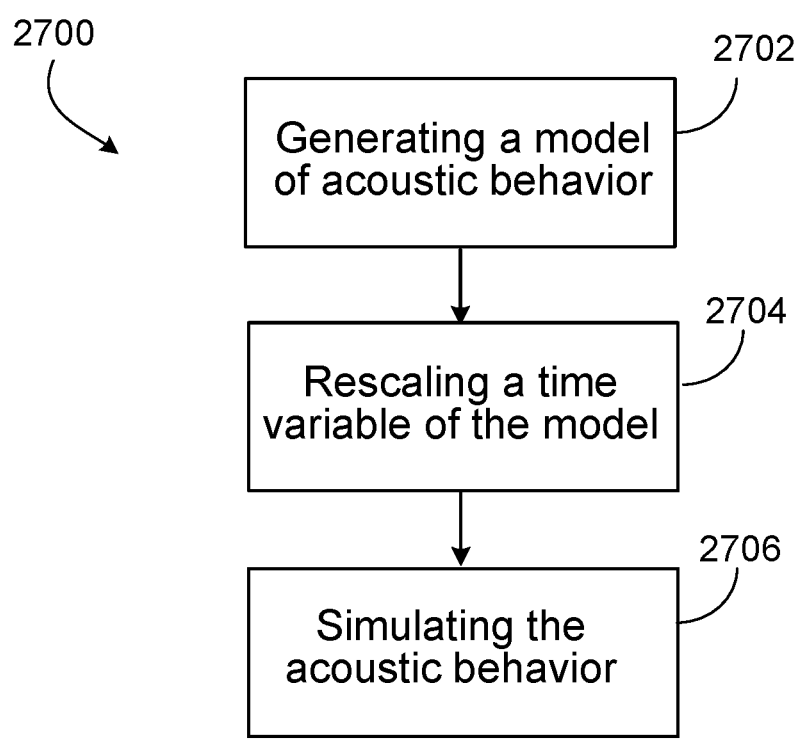
FIG. 27 is a flow chart of an example process for processing data representing acoustic properties of a porous medium modeled in accordance with tortuosity

FIG. 27 is a flow chart of an example process 2700 for processing data representing acoustic properties of a porous medium modeled in accordance with tortuosity. The process can be performed by a data processing apparatus, such as a computer system.

The process 2700 includes generating 2702 a model of acoustic behavior of a fluid filled porous media including an effect of tortuosity, with the model comprising a time variable indicative of a sound speed of the fluid.

The process 2700 includes rescaling 2704 the time variable of the model based on the sound speed in a fluid in the porous medium. Rescaling the time variable can include adjusting the amount of time represented by one simulation time step. The time may be rescaled based on a streamline length of the porous medium and a thickness of the porous medium being simulated. As the time is rescaled, the temperature and/or pressure within the model may also be rescaled.

The process 2700 includes simulating 2706 the acoustic behavior including the effect of tortuosity of the porous medium based on the rescaling of the time variable within the model. The simulation can be used to determine acoustic behavior within the model in accordance with the simulated tortuosity. The acoustic behavior may include simulating the dissipation and propagation of acoustic waves.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs (also referred to as a data processing program) (i.e., one or more modules of computer program instructions, encoded on computer storage medium for execution by, or to control the operation of, data processing apparatus). A computer storage medium can be, or be included in, a computer-readable storage device, a computer-readable storage substrate, a random or serial access memory array or device, or a combination of one or more of them. The computer storage medium can also be, or be included in, one or more separate physical components or media (e.g., multiple CDs, disks, or other storage devices). The subject matter may be implemented on computer program instructions stored on a non-transitory computer storage medium.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example: a programmable processor, a computer, a system on a chip, or multiple ones, or combinations, of the foregoing. The apparatus can include special purpose logic circuitry (e.g., an FPGA (field programmable gate array) or an ASIC (application specific integrated circuit)). The apparatus can also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks), however, a computer need not have such devices. Moreover, a computer can be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive)). Devices suitable for storing computer program instructions and data include all forms of non-volatile memory, media and memory devices, including by way of example, semiconductor memory devices (e.g., EPROM, EEPROM, and flash memory devices), magnetic disks (e.g., internal hard disks or removable disks), magneto optical disks, and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback) and input from the user can be received in any form, including acoustic, speech, or tactile input. In addition, a computer can interact with a user by sending documents to and receiving documents from a device that is used by the user (for example, by sending web pages to a web browser on a user's user device in response to requests received from the web browser).

Embodiments of the subject matter described in this specification can be implemented in a computing system that includes a back end component (e.g., as a data server), or that includes a middleware component (e.g., an application server), or that includes a front end component (e.g., a user computer having a graphical user interface or a Web browser through which a user can interact with an implementation of the subject matter described in this specification), or any combination of one or more such back end, middleware, or front end components. The components of the system can be interconnected by any form or medium of digital data communication (e.g., a communication network). Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a data processing apparatus for processing data representing the effect of tortuosity of a porous material on the acoustic behavior of a fluid in the porous material, the method comprising:
   generating by a data processing program of the data processing apparatus, a model of acoustic behavior of the fluid in the porous material including an effect of tortuosity, with the model comprising a time variable indicative of a sound speed of the fluid;
   rescaling the time variable of the model based on the sound speed in the fluid in the porous material; and
   simulating the acoustic behavior including the effect of tortuosity of the porous material based on the rescaling of the time variable within the model.

2. The method of claim 1, further comprising determining acoustic behavior within the model including the effect of the tortuosity of the porous material.

3. The method of claim 2, wherein the acoustic behavior comprises dissipation and propagation of sound waves.

4. The method of claim 1, wherein rescaling the time variable comprises adjusting the amount of time represented by one simulation time step.

5. The method of claim 1, wherein simulating the acoustic behavior comprises simulating fluid flow through or within the porous material.

6. The method of claim 1, wherein the model includes a momentum sink that accounts for acoustic losses of the porous material.

7. The method of claim 1, wherein rescaling the time variable is based on a nominal sound speed of the fluid and the sound speed of the fluid in the porous material.

8. The method of claim 1, wherein the fluid is represented by elements, the elements comprise one or more of mass, density, momentum, pressure, velocity, temperature, energy, mass fluxes, momentum fluxes, and energy fluxes within the fluid.

9. The method of claim 1, wherein rescaling the time variable comprises rescaling a temperature of the model.

10. The method of claim 9, wherein rescaling the time variable further comprises rescaling a pressure of the model.

11. The method of claim 9, wherein rescaling the time variable further comprises rescaling the velocity of the fluid.

12. The method of claim 9, wherein rescaling the time variable further comprises rescaling the resistance of the porous material.

* * * * *